(12) United States Patent
Dubreuil et al.

(10) Patent No.: US 11,560,233 B2
(45) Date of Patent: Jan. 24, 2023

(54) HYBRID AIRCRAFT PROPULSION POWER PLANTS

(71) Applicant: PRATT & WHITNEY CANADA CORP., Longueuil (CA)

(72) Inventors: Jean Dubreuil, Boucherville (CA); Richard Ullyott, Cornwall (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/462,783

(22) Filed: Aug. 31, 2021

(65) Prior Publication Data
US 2022/0119119 A1 Apr. 21, 2022

Related U.S. Application Data

(63) Continuation of application No. 16/830,368, filed on Mar. 26, 2020, now Pat. No. 11,186,378.
(Continued)

(51) Int. Cl.
| | |
|---|---|
| *B64D 27/02* | (2006.01) |
| *F02C 7/32* | (2006.01) |
| *B64D 27/24* | (2006.01) |
| *B64D 35/02* | (2006.01) |
| *H02K 7/102* | (2006.01) |
| *H02K 7/108* | (2006.01) |
| *B64D 41/00* | (2006.01) |
| *B60W 20/30* | (2016.01) |

(Continued)

(52) U.S. Cl.
CPC ............. *B64D 27/02* (2013.01); *B60W 20/30* (2013.01); *B60W 20/40* (2013.01); *B64D 27/24* (2013.01); *B64D 35/02* (2013.01); *B64D 35/08* (2013.01); *B64D 41/00* (2013.01); *F02C 7/32* (2013.01); *F02C 7/36* (2013.01); *H02K 7/102* (2013.01); *H02K 7/108* (2013.01); *B64D 27/08* (2013.01); *B64D 27/14* (2013.01); *B64D 2027/026* (2013.01); *Y02T 50/60* (2013.01)

(58) Field of Classification Search
CPC .. B64D 2027/026; B64D 35/00; B64D 35/02; B64D 41/04; F02C 7/36; F02C 3/107; F02C 6/206; F02B 61/04
See application file for complete search history.

(56) References Cited

U.S. PATENT DOCUMENTS

| | | |
|---|---|---|
| 5,271,295 A | 12/1993 | Mamot |
| 5,782,433 A | 7/1998 | Goi |

(Continued)

*Primary Examiner* — Pedro J Cuevas
(74) *Attorney, Agent, or Firm* — Norton Rose Fulbright Canada LLP

(57) ABSTRACT

An aircraft power plant has: an electric motor; a compressor; a combustion engine; an output shaft drivingly engageable to a thrust generator for propelling an aircraft equipped with the aircraft power plant; and a transmission including a gearbox having a first input drivingly engaged by the electric motor, a first output drivingly engaging the compressor, a second input drivingly engageable by the combustion engine, and a second output drivingly engageable to the output shaft, wherein the transmission has: a propulsion configuration in which the output shaft and the compressor are drivingly engaged to the electric motor and to the combustion engine via the gearbox, and an auxiliary power unit configuration in which the combustion engine and the output shaft are at rest while the electric motor drivingly engages the compressor.

20 Claims, 14 Drawing Sheets

Related U.S. Application Data

(60) Provisional application No. 62/826,189, filed on Mar. 29, 2019.

(51) Int. Cl.
*B60W 20/40* (2016.01)
*B64D 35/08* (2006.01)
*F02C 7/36* (2006.01)
*B64D 27/14* (2006.01)
*B64D 27/08* (2006.01)

(56) References Cited

U.S. PATENT DOCUMENTS

| | | |
|---|---|---|
| 7,413,142 B2 | 8/2008 | Gmirya |
| 7,575,192 B1 | 8/2009 | Kish |
| 7,805,947 B2 | 10/2010 | Moulebhar |
| 8,283,796 B2 | 10/2012 | Certain |
| 8,324,746 B2 | 12/2012 | Bradbrook |
| 8,684,304 B2 | 4/2014 | Burns et al. |
| 8,727,271 B2 | 5/2014 | Salyer |
| 9,062,611 B2 | 6/2015 | Sheridan |
| 9,193,451 B2 | 11/2015 | Salyer |
| 9,493,245 B2 | 11/2016 | Salyer |
| 9,810,158 B2 | 11/2017 | Foutch |
| 10,180,080 B2 | 1/2019 | Munevar |
| 10,378,442 B2 | 8/2019 | Jackowski |
| 10,400,858 B2 | 9/2019 | Mitrovic et al. |
| 10,408,133 B2 | 9/2019 | Wintgens |
| 10,550,770 B2 | 2/2020 | Foutch |
| 10,850,863 B2 | 12/2020 | Bisson |
| 10,954,865 B2 | 3/2021 | Mackin |
| 2006/0260323 A1 | 11/2006 | Moulebhar |
| 2006/0272313 A1 | 12/2006 | Eick |
| 2009/0145998 A1 | 6/2009 | Salyer |
| 2010/0013223 A1 | 1/2010 | Certain |
| 2010/0219779 A1 | 9/2010 | Bradbrook |
| 2010/0300117 A1 | 12/2010 | Moulebhar |
| 2014/0346283 A1 | 11/2014 | Salyer |
| 2014/0367525 A1 | 12/2014 | Salyer |
| 2015/0191250 A1 | 7/2015 | DeVita |
| 2015/0275758 A1 | 10/2015 | Foutch |
| 2015/0275769 A1 | 10/2015 | Foutch |
| 2016/0097328 A1 | 4/2016 | Wintgens |
| 2017/0268430 A1 | 9/2017 | Schwarz |
| 2018/0283274 A1 | 10/2018 | Jackowski |
| 2020/0277075 A1 | 9/2020 | Dubreuil |
| 2020/0298988 A1 | 9/2020 | LaTulipe |
| 2020/0307817 A1 | 10/2020 | Dubreuil |
| 2020/0307818 A1 | 10/2020 | Dubreuil |
| 2020/0347787 A1 | 11/2020 | Crowley |
| 2021/0017878 A1 | 1/2021 | Golfin |
| 2021/0047969 A1 | 2/2021 | Terwilliger |
| 2021/0047970 A1 | 2/2021 | Collopy |
| 2021/0050810 A1 | 2/2021 | Collopy |

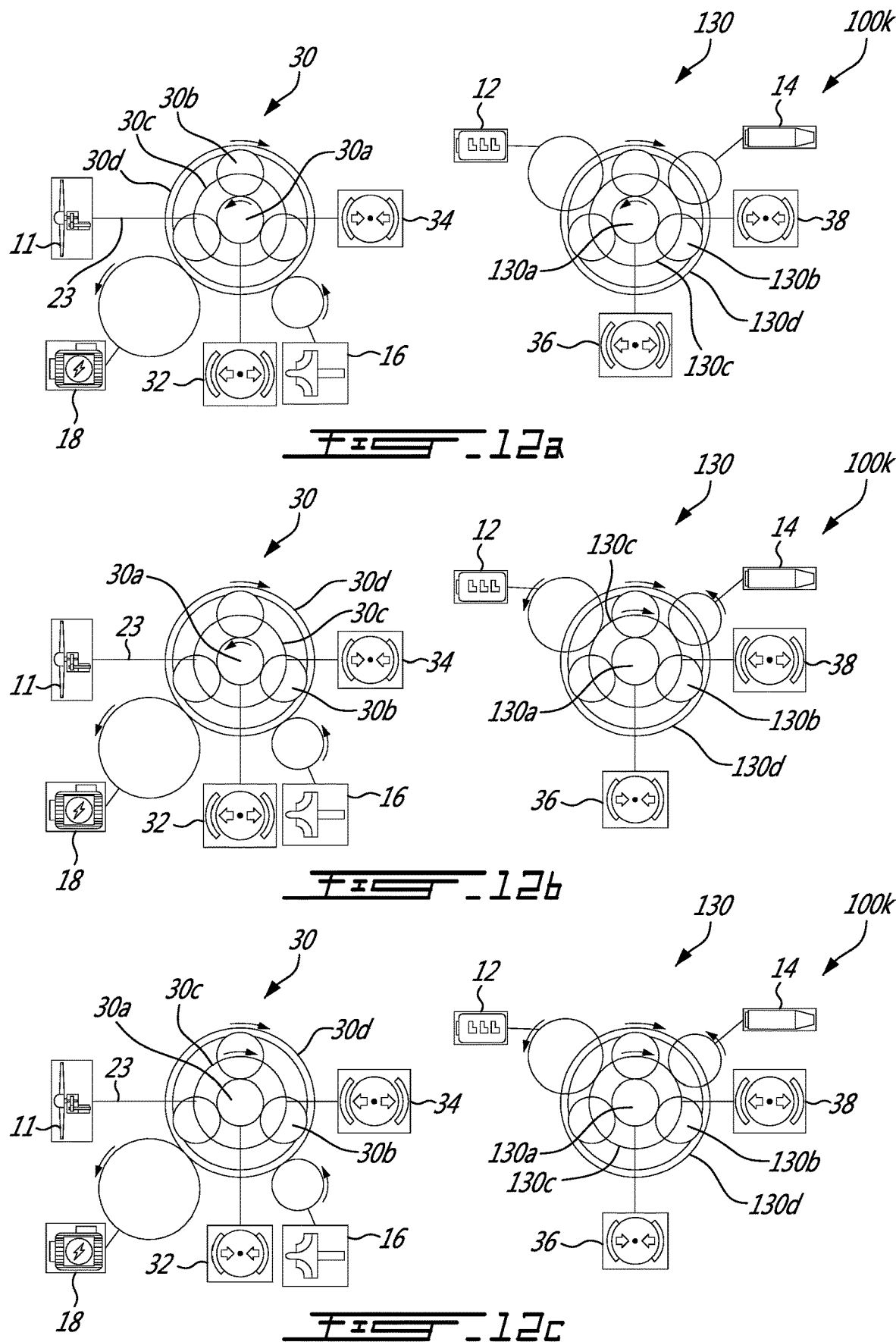

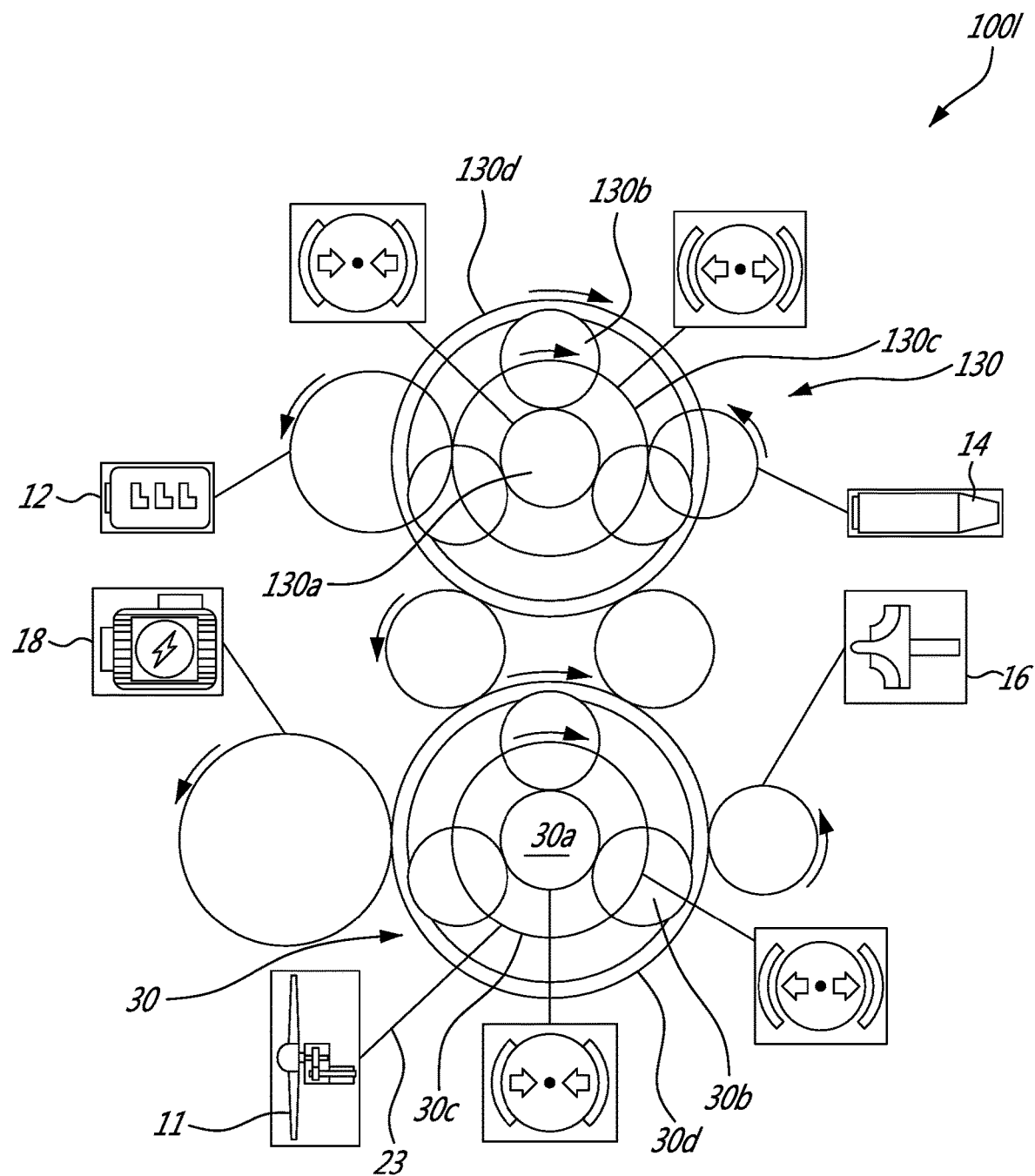

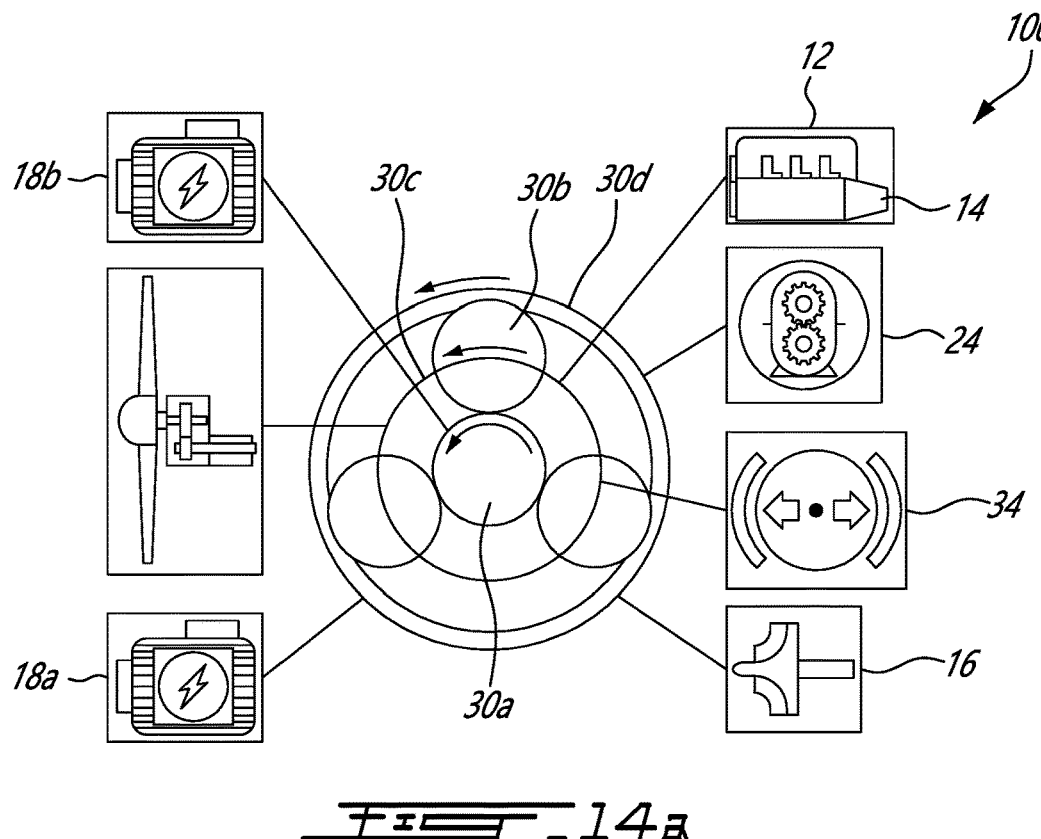
FIG_14a
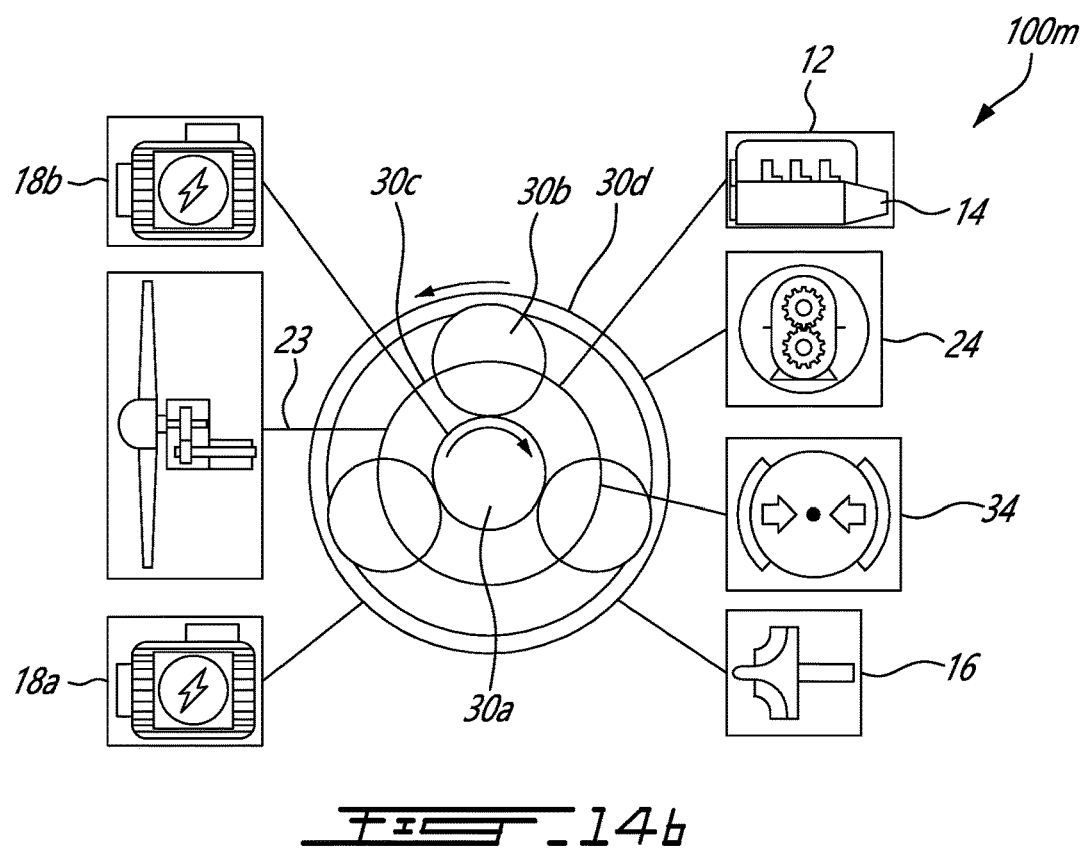
FIG_14b

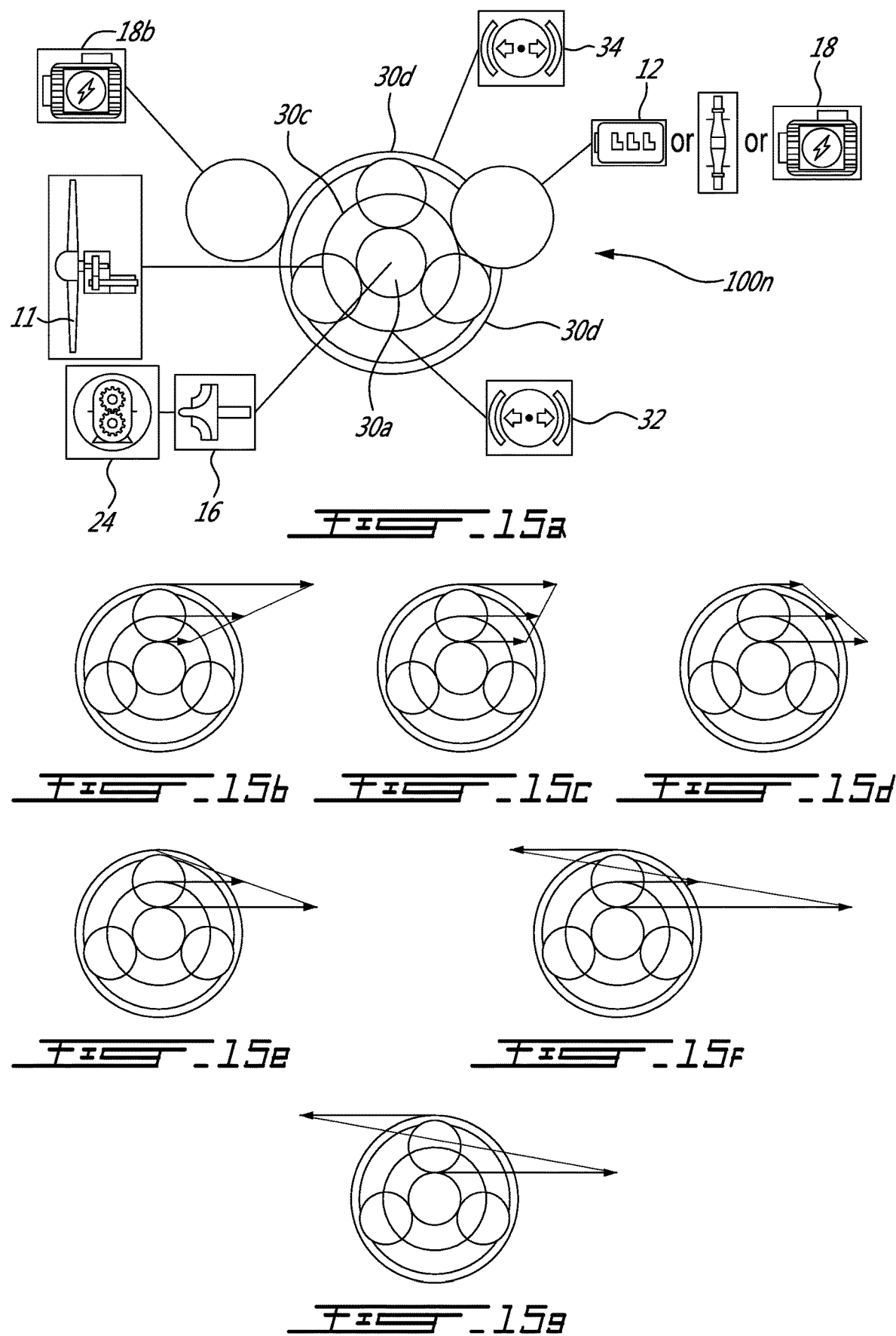

HYBRID AIRCRAFT PROPULSION POWER PLANTS

CROSS-REFERENCE TO RELATED APPLICATIONS

This application claims priority from U.S. patent application 62/826,189 filed on Mar. 29, 2019, and is a continuation of U.S. patent application Ser. No. 16/830,368 filed on Mar. 26, 2020, the entire contents of which are incorporated by reference herein.

TECHNICAL FIELD

The application relates generally to hybrid aircraft propulsion power plants and in particular to means for operating a propulsion engine on the aircraft in an auxiliary power unit mode.

BACKGROUND OF THE ART

An auxiliary power unit (APU) is typically used in aircraft to provide various functionalities, such as an independent power drive as an adjunct to a primary engine. For example an APU may be used to provide back-up power to the electrical power system of an aircraft, while the aircraft is grounded or during an in-flight emergency. APU are typically shut down when power form the primary engine is available.

SUMMARY

In one aspect, there is provided an aircraft power plant comprising: an electric motor; a compressor; a combustion engine; an output shaft drivingly engageable to a thrust generator for propelling an aircraft equipped with the aircraft power plant; and a transmission including a gearbox having a first input drivingly engaged by the electric motor, a first output drivingly engaging the compressor, a second input drivingly engageable by the combustion engine, and a second output drivingly engageable to the output shaft, wherein the transmission has: a propulsion configuration in which the output shaft and the compressor are drivingly engaged to the electric motor and to the combustion engine via the gearbox, and an auxiliary power unit configuration in which the combustion engine and the output shaft are at rest while the electric motor drivingly engages the compressor.

The aircraft power plant described above may include any of the following features, in any combinations.

In some embodiments, the gearbox is a planetary gear train having a sun gear, planet gears meshed with the sun gear and rollingly supported by a planet carrier, and a ring gear meshed with the planet gears.

In some embodiments, the first input is engaged to one of the sun gear, the planet carrier, and the ring gear, the first output engaged to the one of the sun gear, the planet carrier, and the ring gear, the second input engaged to another one of the sun gear, the planet carrier, and the ring gear, and the second output engaged to the other one of the sun gear, the planet carrier, and the ring gear.

In some embodiments, the first input is engaged to the ring gear, the first output engaged to the ring gear, the second input engaged to the planet carrier, and the second output engaged to the planet carrier.

In some embodiments, a brake is engaged to a remaining one of the sun gear, the planet carrier, and the ring gear, the brake having an engaged configuration in which rotation of the remaining one of the sun gear, the planet carrier, and the ring gear is blocked and a disengaged configuration in which rotation of the remaining one of the sun gear, the planet carrier, and the ring gear is permitted, the brake being in the engaged configuration in the propulsion configuration and in the disengaged configuration in the auxiliary power unit configuration.

In some embodiments, the first input is engaged to one of the sun gear, the planet carrier, and the ring gear, the first output engaged to the one of the sun gear, the planet carrier, and the ring gear, the second input engaged to the one of the sun gear, the planet carrier, and the ring gear, and the second output engaged to another one of the sun gear, the planet carrier, and the ring gear.

In some embodiments, the first input is engaged to the ring gear, the first output engaged to the ring gear, the second input engaged to the ring gear via a clutch, and the second output engaged to the planet carrier.

In some embodiments, a brake is engaged to a remaining one of the sun gear, the planet carrier, and the ring gear, the brake having an engaged configuration in which rotation of the remaining one of the sun gear, the planet carrier, and the ring gear is blocked and a disengaged configuration in which rotation of the remaining one of the sun gear, the planet carrier, and the ring gear is permitted, the brake being in the engaged configuration in the propulsion configuration and in the disengaged configuration in the auxiliary power unit configuration.

In some embodiments, the first input is engaged to one of the sun gear, the planet carrier, and the ring gear, the first output engaged to another one of the sun gear, the planet carrier, and the ring gear, the second input engaged to the one of the sun gear, the planet carrier, and the ring gear, and the second output engaged to the one of the sun gear, the planet carrier, and the ring gear, and a second electric motor engaged to a remaining one of the sun gear, the planet carrier, and the ring gear.

In some embodiments, the first input is engaged to the planet carrier, the first output engaged to the sun gear, the second input engaged to the planet carrier, the second output engaged to the planet carrier, the second electric motor engaged to the ring gear.

In some embodiments, the second electric motor is operable to drive the compressor while rotation of the planet carrier is blocked by a brake engageable to the planet carrier.

In some embodiments, a turbine has a turbine inlet fluidly connected to an exhaust of the combustion engine, the turbine drivingly engaged to the combustion engine to compound power with the combustion engine.

In another aspect, there is provided an aircraft power plant comprising: an electric motor; a compressor; a combustion engine; an output shaft drivingly engageable to a thrust generator for propelling an aircraft equipped with the aircraft power plant; and a planetary gear train having a sun gear, planet gears meshed with the sun gear and rollingly supported by a planet carrier, and a ring gear meshed with the planet gears, the electric motor engaged to one of the sun gear, the planet carrier, and the ring gear, the compressor engaged to the one of the sun gear, the planet carrier, and the ring gear, the output shaft engaged to another one of the sun gear, the planet carrier, and the ring gear, the combustion engine engaged to the other one of the sun gear, the planet carrier, and the ring gear; and a brake having operatively connected to a remaining one of the sun gear, the planet carrier, and the ring gear, the brake having: a first configuration in which the output shaft and the compressor are drivingly engaged to the electric motor and to the combustion engine via the planetary gear train, and a second configuration in which the combustion engine and the output shaft are at rest while the electric motor drivingly engages the compressor.

The aircraft power plant described above may include any of the following features, in any combinations.

In some embodiments, the electric motor and the compressor are engaged to the ring gear, the combustion engine and the output shaft engaged to the planet carrier, the brake operatively connected to the sun gear.

In some embodiments, a turbine has a turbine inlet fluidly connected to an exhaust of the combustion engine, the turbine drivingly engaged to the other one of the sun gear, the planet carrier, and the ring gear to compound power with the combustion engine in driving the output shaft.

In some embodiments, the electric motor and the compressor are engaged to the ring gear, the output shaft engaged to the planet carrier, the combustion engage selectively drivingly engaged to the ring gear via a clutch, the brake engaged to the sun gear.

In yet another aspect, there is provided an aircraft power plant comprising: an electric motor; a compressor; a combustion engine; an output shaft drivingly engageable to a thrust generator for propelling an aircraft equipped with the aircraft power plant; and a gearbox having a plurality of gears meshed with one another, the gearbox having a first input drivingly engaged by the electric motor, a first output drivingly engaging the compressor and in driving engagement with the first input, a second input drivingly engageable by the combustion engine, and a second output drivingly engageable to output shaft and drivingly engaged to the second input and to the first input; a first clutch between the combustion engine and the second input, the first clutch having a first engaged configuration in which the combustion engine is drivingly engaged to the second input and a first disengaged configuration in which the combustion engine is disengaged from the second input; and a second clutch between the output shaft and the second output, the second clutch having a second engaged configuration in which the output shaft is drivingly engaged to the second output and a second disengaged configuration in which the output shaft is disengaged from the second output.

The aircraft power plant described above may include any of the following features, in any combinations.

In some embodiments, the electric motor is engaged to the compressor via a first set of gears of the plurality of gears, the second input drivingly engaged to the second output via at least one gear of the first set of gears of the plurality of gears.

In some embodiments, the plurality of gears have different diameters to provide speed ratios.

In some embodiments, the first clutch is in the first engaged configuration while the second clutch is in the second engaged configuration, the first clutch being in the first disengaged configuration while the second clutch is in the second disengaged configuration.

DESCRIPTION OF THE DRAWINGS

Reference is now made to the accompanying figures in which:

FIGS. 12a to 12c are schematic views of another aircraft power plant operable in a first APU mode (FIG. 12a), in a second APU mode (FIG. 12b), and in a propulsion mode (FIG. 12c) in accordance with one embodiment;

FIG. 13 is a schematic view of another aircraft power plant operable in an APU and a propulsion mode in accordance with one embodiment;

FIGS. 14a and 14b are schematic views of another aircraft power plant operable in a propulsion mode (FIG. 14a) and in an APU mode (FIG. 14b) in accordance with one embodiment;

FIGS. 15a to 15g are schematic view of another aircraft power plant (FIG. 15a) operable in a prolusion mode and in an APU mode and illustrating relative rotations (FIGS. 15b to 15g) of different components of a planetary gear train in function of the operation mode.

DETAILED DESCRIPTION

Figure 1:
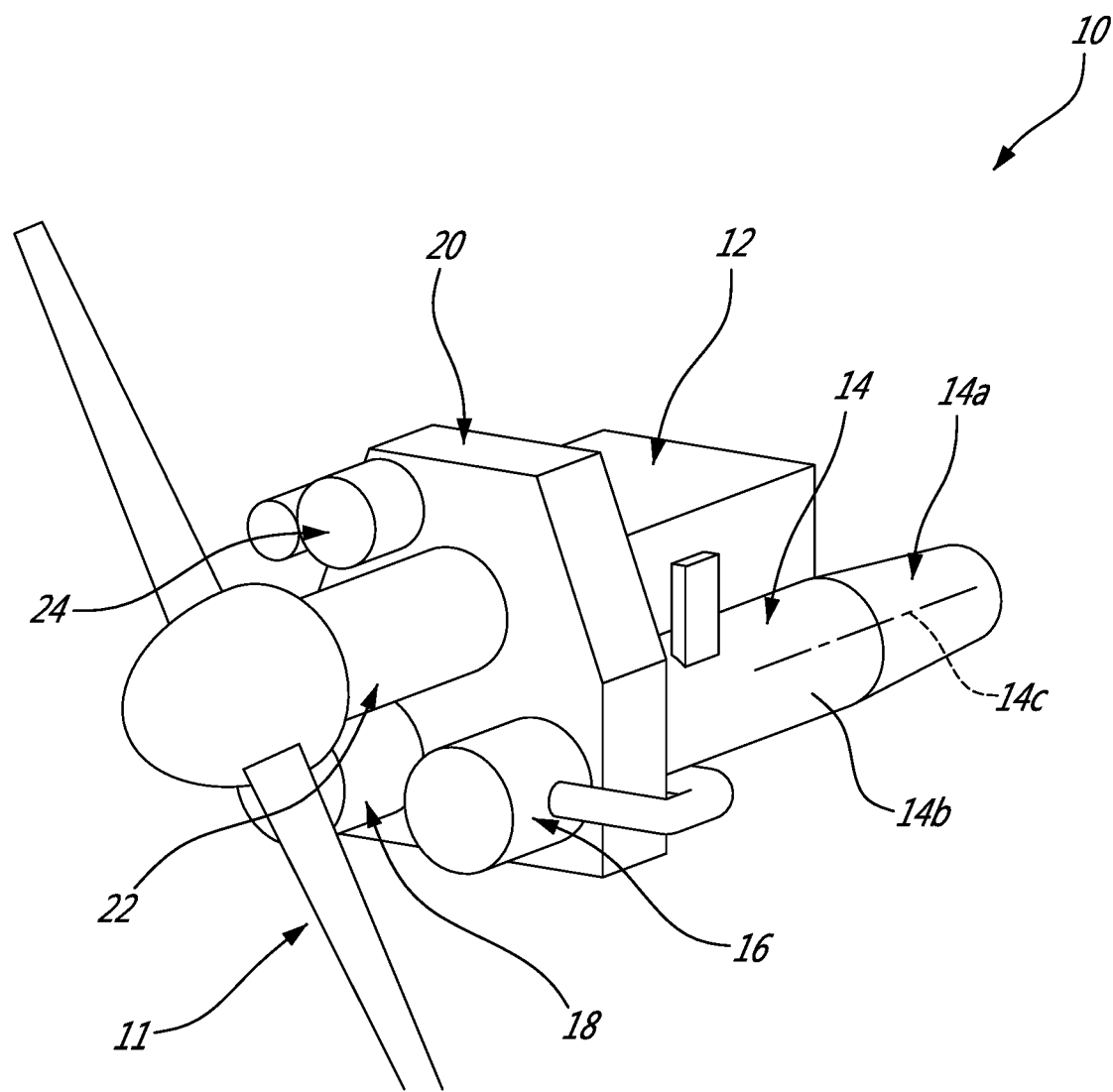
FIG. 1 is a schematic view of a hybrid engine arrangement suitable for use as a main propulsion power plant on a hybrid electric aircraft.

FIG. 1 illustrates an example of a propulsion engine for an aircraft. More particularly, FIG. 1 illustrates a power plant 10 suitable to provide thrust to a prime mover propulsor of the aircraft. It is understood that the power plant 10 can adopt various configurations. According to the illustrated example, the power plant 10 is configured as a turboprop engine for driving a propeller 11. However, the power plant 10 could also be configured as a turboshaft engine for driving a helicopter rotor or any other thrust producing device or thrust generator or rotor for providing motive power to the aircraft.

The power plant 10 may generally have a combustion engine 12, a turbocharger 14, a boost compressor 16, an electric motor/generator (electric motor) 18, which may be powered by an on-board battery pack (not shown), and a compounding or power combining gearbox 20 having a main output drivingly connected to a reduction gearbox (RGB) 22 that is, in turn, drivingly connected to the propeller 11. As shown in FIG. 1, the compounding gearbox 20 can also act as an accessory gearbox by having secondary outputs drivingly connected to accessories 24 (e.g. fuel pump, oil pump, starter, etc.). Also, the (RGB) 22 could be integrated to the compounding gearbox 20.

The combustion engine 12 may be part of a module that may include one or more internal combustion engines engaged to a common shaft (not shown) to provide a first drive input to the compounding gearbox 20. In a particular embodiment, the internal combustion engine(s) is/are rotary internal combustion engine(s), for example Wankel engine(s); as described in U.S. Pat. No. 9,353,680 granted to Villeneuve et al., in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. It is however understood that other types of internal combustion engines may alternately be used.

In accordance with another possible embodiment, the combustion engine module 12 may comprise a gas turbine engine, for instance, a single spool turbine engine or other turbine engine configurations where a load remains on the turbine when disconnected from the propeller.

Various possible schematics for the power plant are described herein below. Like reference numerals in different drawings refer to like elements of the power plants. It is understood that a plurality of variations or combinations of the disclosed power plants are contemplated. For instance, more than one electric motor 18 may be used, either to compound their rotational input or for driving different elements. In some cases, the one or more electric motor may be used as generators to recharge the batteries.

State differently, an electric motor module may include one or more electric motors 18. The electric motor module may include one or more motors or rotor/stator combinations capable of producing a rotating output torque when provided with suitable electric power. The electric motor module 18 provides a second drive input to the compounding gearbox 20. In this way, the joint power of the electric motor module 18 and the combustion engine module 12 may be used to drive a common load (e.g. the propeller 11, the compressor 16, the accessories 24, etc.).

The turbocharger 14 has a turbine section 14a which may provide a third drive input to the compounding gearbox 20. Accordingly, the turbocharger 14 may compound power with the combustion engine 12 and the electric motor 18 to drive a common load. Alternatively, the turbocharger 14 could only be used to drive the compressor 16. It is noted that the compressor 16 may be mounted to the shaft of the turbine section of the turbocharger 14 or not. The turbocharger 14 may further includes a compressor 14b for compressing air from an environment and having an outlet fluidly connected to an air inlet of the combustion engine 12. The compressor and the turbine 14b, 14a of the turbocharger 14 may be in driving engagement on a shaft 14c, which is shown schematically with a dashed line in FIG. 1.

It is noted that the power plant 10 could further comprise a dedicated cabin bleed compressor in addition to the boost compressor 16. The dedicated cabin compressor could be sized for the specific needs of the cabin air only.

In operation, the compressor 16 feeds compressed air to the inlet(s) of the combustion engine module 12. The combustion engine module 12 receives the pressurized air from the compressor 16 and burns fuel at high pressure to provide energy. Mechanical power produced by the combustion engine module 12 is inputted into the compounding gearbox 20. The combustion engine module 12 provides an exhaust flow in the form of exhaust pulses of high pressure hot gas exiting at high peak velocity. The outlet of the combustion engine module 12 is in fluid communication with an inlet of the turbine section of the turbocharger 14, and accordingly the exhaust flow from the combustion engine module 12 is supplied to the turbine section of the turbocharger 14 before being exhausted to atmosphere.

As will be seen hereinafter, various mechanical arrangements are herein contemplated for allowing an aircraft power plant such as the various exemplary power plants described herein above to also be used as an auxiliary power unit (APU) to generate electrical power and/or pressurized air to the aircraft to support the aircraft pneumatic system while the aircraft is on the ground. With the following defined methods of incorporating an APU mode, the boost compressor 16 or a dedicated cabin bleed compressor may be driven to provide bleed air services to the aircraft while the propeller 11 is disengaged (i.e. the propeller is not rotated, the propeller is in AU mode).

Depending upon the proposed configurations, the APU mode activates the compressor using either the electric motor module 18 alone, the combustion engine module 12 alone, the combustion engine module 12 alone with the electric motor module 18 in generator mode to assist in recharging the batteries or using both the electric motor module 18 and the combustion engine module 12. Incorporating an APU function in the design of an hybrid engine allows to eliminate the need for a separate aircraft APU or a separate electrically driven compressor, which saves equipment cost, reduces the aircraft weight and reduces the aircraft equipment maintenance time and cost.

In all of the embodiments described below, the aircraft power plants include a hybrid propulsion system S including at least one combustion engine 12 and at least one electric motor 18. A transmission, different embodiments of which are described herein below, is used for receiving the rotational inputs of the different components, such as the combustion engine and the electric motor, operatively connected thereto and to transmits required inputs to other components in need of rotation inputs, such as the load compressor and the thrust generator 11 (e.g., propeller, fan, rotor, and so on).

In the following lines, when two different components are said to be "drivingly engaged" to one another it implies that a rotational input is transmitted from one of the two components to the other. In some cases, two different components are "disengaged" from one another. This may be achieved having a brake in a drive, load, or transmission path therebetween.

In the following lines, the expression "transmission" may be any device able to receive a rotational input via an input and to transmit it to an output. The transmission may include, for instance, gears meshed with one another, pulleys and belts, clutches, one-way clutches, brakes, and so on.

The expressions "combustion engine", or "heat engine", may be any engine able to generate a torque based on a combustion of a hydrocarbon, such as a fossil fuel. The fuel may be a synthetic fuel derived from other sources. Such a fuel may be, for instance, alcohol or bio diesel. The combustion engine may be, for instance, a reciprocating engine such as a piston engine, a rotary engine, a gas turbine engine of any types such as a turbofan, a turboshaft, and a turbojet. The combustion engine may define one or more combustion chambers of varying volume.

The expression "hybrid" means that the power plant includes at least one electric motor and at least one combustion engine so that the power provided by the power plant comes from two different sources (e.g., electrical and chemical/thermal).

The expression "compressor" may include any machine able to increase a pressure of a fluid. For instance, the compressor may be a centrifugal compressor, an axial compressor, a combination of the an axial compressor and a centrifugal compressor. The compressor may include one or more compression stages.

The expression "output shaft" may include an output of the transmission that is drivingly engageable to the thrust generator. The output shaft may be directly engaged to the thrust generator or may be engaged to said generator via the RGB 22.

Interruptible Path

Figure 2:
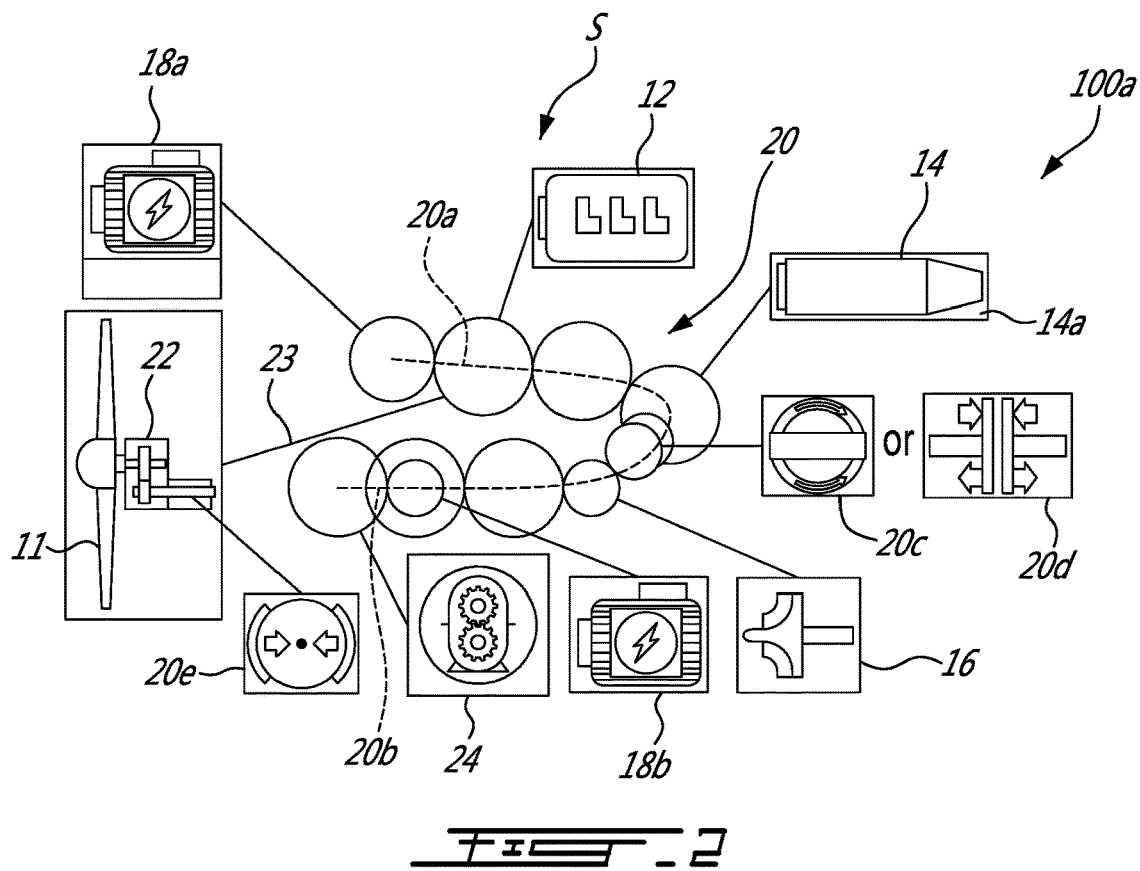
FIG. 2 is a schematic view of an aircraft power plant operable in an APU mode and a propulsion mode in accordance with one embodiment.

Referring now to FIG. 2, an aircraft power plant in accordance with one embodiment is shown generally at 100a. The power plant 100a includes a transmission 20. In the embodiment shown, the transmission 20 defines a first drive path 20a and a second drive path 20b, which are shown in dashed lines. Herein, the first and second drive paths 20a, 20b are gear trains selectively engageable to one another via a one-way clutch 20c or an electromechanical clutch 20d. A one-way clutch is also referred to as an over-running clutch. An active clutch providing positive engagement and disengagement of the drive may be used. Such an active clutch may be an electromechanical clutch, a hydraulic clutch, or a mechanically actuated clutch. The first and second drive paths 20a, 20b can consist of a number of spur gears or the like. Idler gears may be provided in each drive path to accommodate shaft spacing when needed and/or to change rotational direction when required. In this particular embodiment, the electric motor module 18 comprises a first electric motor 18a and a second electric motor 18b. Two electric motors 18a, 18b may be useful when the compressor 16 is physically located too far from the main electric motor 18b to be easily geared to it.

The first electric motor 18a, the combustion engine module 12, and the turbine section of the turbocharger 14 are drivingly engaged to the first drive path 20a. As schematically illustrated in FIG. 2, the first drive path 20a has an output drivingly connected to the RGB 22 of the propeller 11. The second electric motor 18b is drivingly engaged to second drive path 20b. The second drive path 20b has a first output for the accessories 24 and a second output for the compressor 16. The mechanical or drive path from the compressor 16 to the turbocharger 14 may be opened by the clutch 20c or 20d to allow the hybrid propulsion system S to be used in an APU mode. Indeed, the a rotational input provided to the compressor gear may be isolated from the turbocharger turbine 14 because of the one-way clutch 20c (or when the electromechanical clutch 20d is disengaged) but the turbocharger 14 can drive the combustion engine 12.

In the embodiment shown, the electric motor 18b and the compressor 16 are in driving engagement with the second transmission drive path 20b. The combustion engine 12 and an output shaft 23 are in driving engagement with the first transmission drive path 20a. Herein, the output shaft 23 corresponds to a shaft that is drivingly engaged to the RGB 22 and acts as an input to the RGB 22.

The one-way clutch 20c or the electromechanical clutch 20d are engagement devices operable in an APU mode and in a propulsion mode. In the APU mode, the two drive paths 20a, 20b are disengaged from one another. In the propulsion mode, the two drive paths 20a, 20b are in driving engagement with each other so that both of the combustion engine 12 and the electric motor 18b are drivingly engaged to the compressor 16 and to the output shaft 23.

The electromechanical clutch 20d may have an engaged configuration that corresponds to the propulsion mode and a disengaged configuration corresponding to the APU mode. For the one-way clutch 20c, a rotational input of the combustion engine 12 is transmittable to the compressor 16a but a rotation input from the electric motor 18b is isolated form the output shaft 23 in the APU mode.

Stated differently, the transmission 20 defines a drive path 20b via which the compressor 16 is drivingly engaged to the electric motor 18b. The output shaft 23 and the combustion engine 12 are drivingly engaged to the drive path 20b in a propulsion mode of the transmission 20 and disengaged from the drive path 20b in an Auxiliary Power Unit (APU) mode.

In a propulsion mode, power inputted in the first drive path 20a by the first electric motor 18a, the combustion engine module 12 and the turbocharger 14 is transferred to the second drive path 20b via the clutch 20b or 20d, thereby allowing the compressor 16 and the accessories 24 to be driven. The second electric motor 18b may be driven so as to be used as a generator or, alternatively, it may be powered to provide an additional power input. For instance, if an on-off tooth clutch is used, the second electric motor 18b could be sized to generate mechanical shaft power in excess of the compressor needs and the excess power could be used to contribute power to the combustion engine module output shaft via the engaged electromechanical clutch 20d and the turbocharger turbine gear. It is noted that the second electric motor 18b could be mounted on a same shaft as the compressor 16.

In the APU mode, the second electric motor 18b is used to drive the compressor 16 without driving components downstream of the clutch 20c or 20d and, thus, may feed the aircraft air systems while the other power sources (e.g. electric motor 18a, combustion engine module 12 and turbocharger turbine 14) are inactive. The lubrication, scavenging and cooling of the second electric motor 18b and compressor 16 are maintained by the accessory drive connected by the gear train common with the second electric motor 18b output. Optionally, a brake 20e may be engaged on the propeller shaft. The brake is optional as the resistance on the rotation of the inactive combustion engine module 12 may be enough in APU mode to maintain the propeller at rest.

Figure 3:
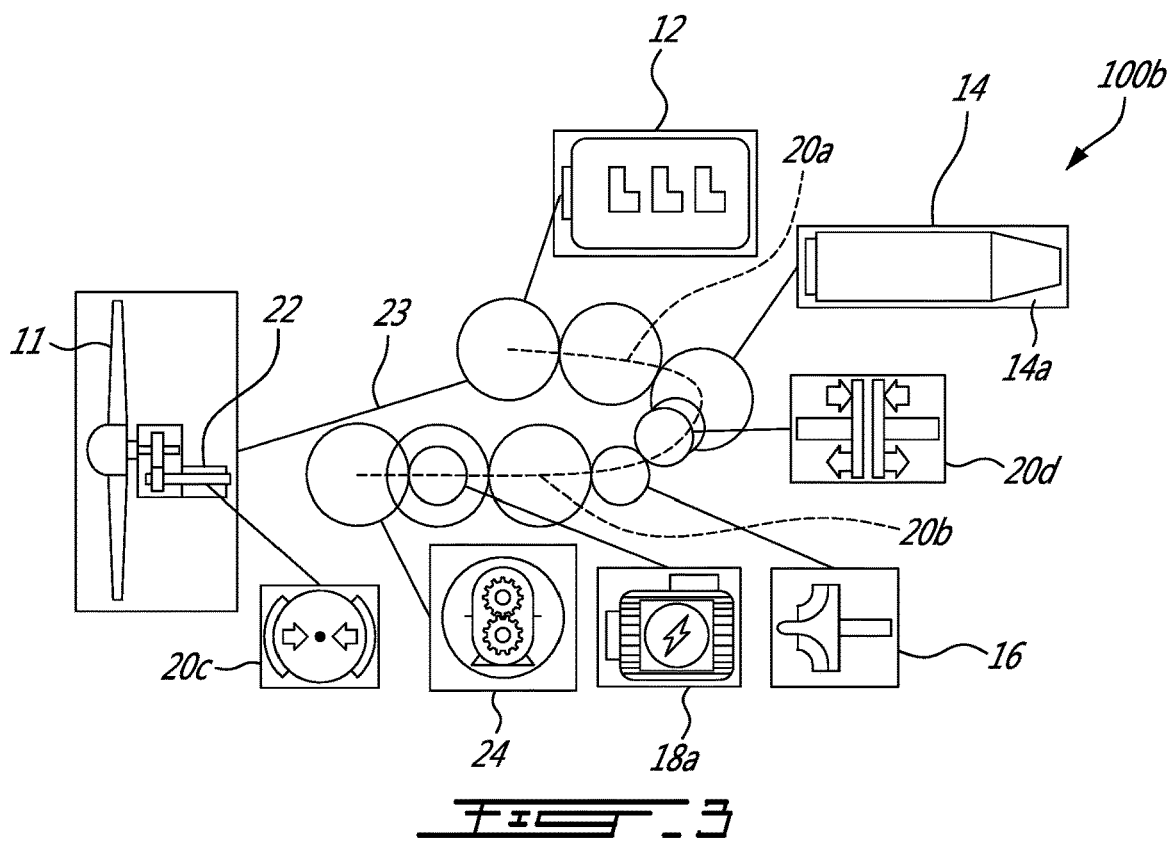
FIG. 3 is a schematic view of another aircraft power plant operable in an APU mode and a propulsion mode in accordance with one embodiment.

FIG. 3 illustrates another possible arrangement of the power plant 100a of FIG. 2 and is shown generally at 100b. In the present embodiment, the transmission 20 comprises first and second drive paths 20a, 20b (e.g. first and second gear trains) connected by a clutch, such as electromechanical clutch 20d. In this embodiment, however, the electric motor module 18 comprises a single electric motor 18a disposed in the vicinity of the compressor 16 and having an input gear forming part of the second drive path 20b. The electric motor 18a is sized for the total electric power requirement (which is in excess of the compressor needs).

The combustion engine module 12 and the turbocharger turbine 14a may provide drive inputs to the first drive path 20a. The first drive path 20a has an output drivingly connected to the RGB 22 via the output shaft 23 for driving the propeller 11. The second drive path 20b has on drive input from the electric motor 18a and two outputs, a first one to the compressor 16 and a second one to the accessories 24.

To start the combustion engine module 12, the clutch 20d is first engaged and then the electric motor 18a is used as a starter to crank the combustion engine 12. In normal propulsion operating mode, the electric motor 18a drives the compressor 16 via the electric motor gear and the compressor gear and delivers excess power to the combustion engine 12 via the engaged clutch 20d. The electric motor 18a thus compounds power with the turbine 14a of the turbocharger 14 and the combustion engine 12 to drive the propeller 11 via the output shaft 23.

In the APU mode, the clutch 20d is disengaged and, thus, the first drive path 20a is disengaged from the second drive path 20b, thereby allowing the compressor 16 to be driven by the electric motor 18a without driving the propeller 11 (i.e. the first drive path and, thus, the propeller 11 is disconnected from the electric motor 18a). As such, compressor air delivery may be provided to the aircraft systems (e.g., environmental control systems) without driving the propeller 11.

An optional brake 20e could be provided and activated in the APU mode to restrain the propeller 11 against rotation. Also a one-way over-running or sprag clutch could be used instead of the on-off clutch 20d. This may however require the use of an additional dedicated start system for the internal combustion engine module 12 instead of being able to use the electric motor 18a.

Figure 4A:
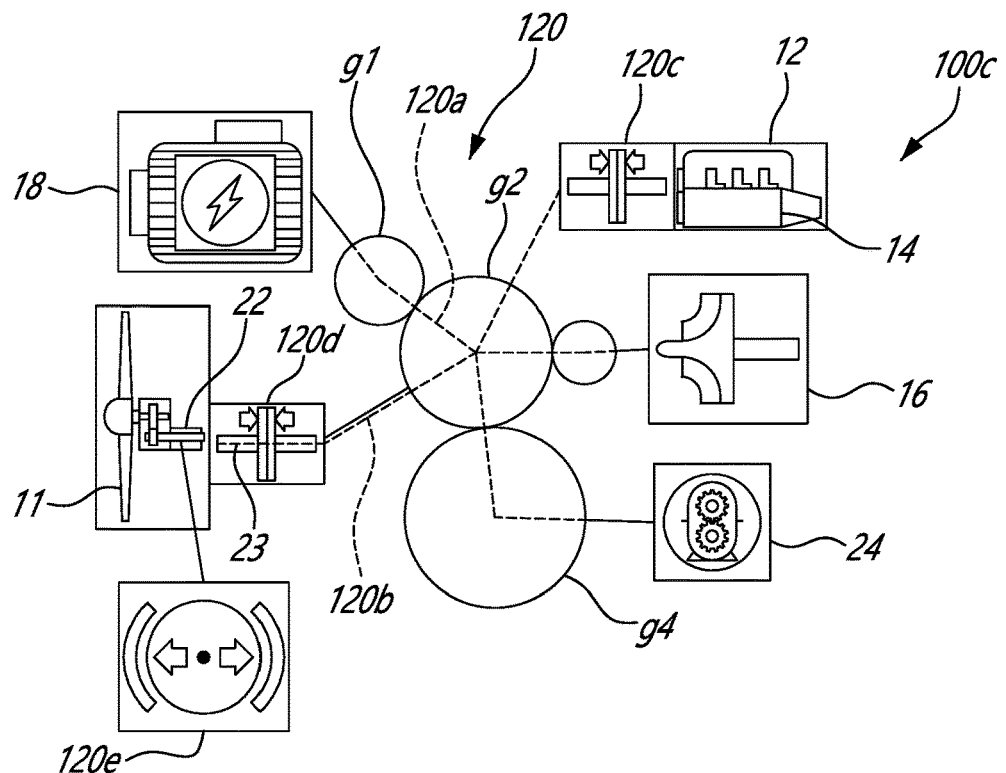
FIGS. 4a and 4b are schematic views of another aircraft power plant operable in a propulsion mode (FIG. 4a) and in an APU mode (FIG. 4b) in accordance with one embodiment.
Figure 4B:
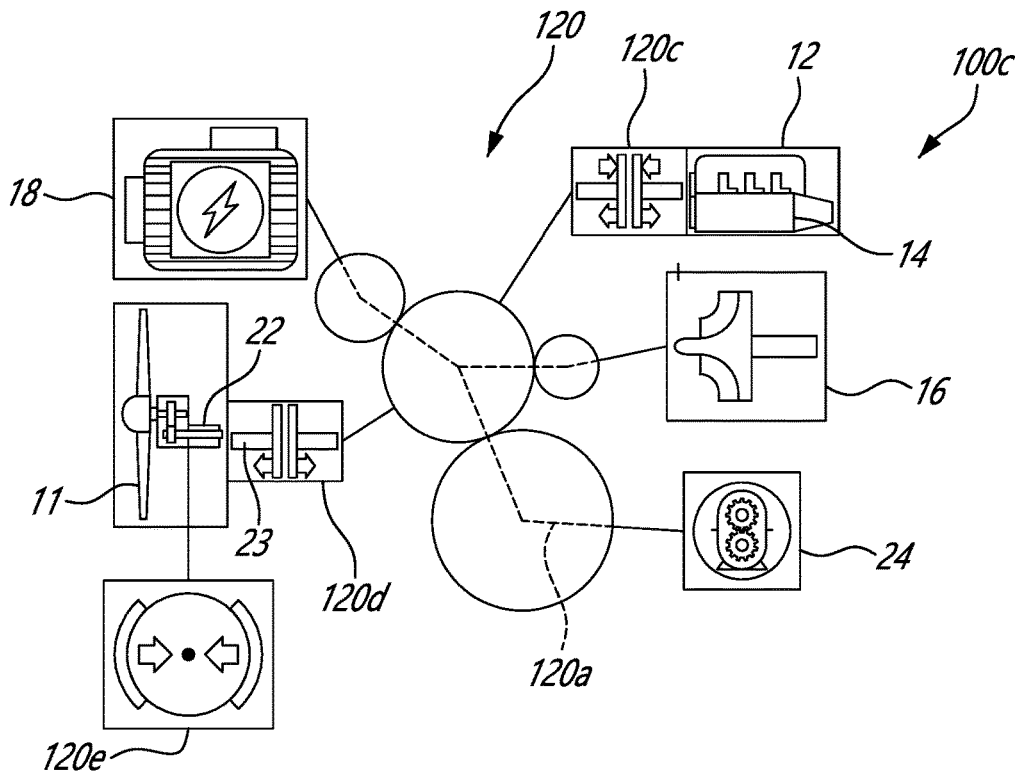

Referring now to FIGS. 4a and 4b another embodiment of an aircraft power plant is shown generally at 100c and is depicted in the propulsion mode in FIG. 4a and in the APU mode in FIG. 4b. The power plant 100c includes a transmission 120 defining a drive path 120a. The electric motor 18 and the compressor 16 are in driving engagement with the drive path 120a. The combustion engine 12 and the output shaft 23 are drivingly engageable to one another along a second drive path 120b via operation of two clutches 120c, 120d.

The first and second drive paths 120a, 120b are engageable to one another via two clutches 120c and 120d. The first clutch 120c is connected between the combustion engine 12 and the first drive path 120a. The second clutch 120d is connected between the output shaft 23 and the first drive path 120a. In the present embodiment, the second drive path 120b is created by the engagement of one or both of the two clutches 120c, 120d. In the propulsion mode, both of the two clutches 120c, 120d are in their engaged configuration such that the combustion engine 12 and the electric motor 18 drivingly engages both of the compressor 16 and the propeller 11. A brake 120e may be used to prevent rotation of the propeller 11 in the APU configuration. This may be desirable if the clutch system has a small amount of residual drag when disengaged, or to prevent wind-milling of the propeller due to external air currents when the drive is disconnected.

In this embodiment, the combustion engine 12 may be integrated with an internally geared turbocharger 14 to provide a common input to the transmission 120. Only a single electric motor may be used in this embodiment and may have an output shaft engaged to an electric motor gear g1 in meshing engagement with a main output gear g2 of the gearbox 20. The output gear g2 is drivingly connected to the RGB 22 via the first clutch 120d. The output gear g2 is also in meshing engagement with the compressor gear g3 of the compressor 16 and with the accessory gear g4 of the accessories 24.

As shown in FIG. 4a, in the propulsion mode, both the first and second clutches 120c, 120d are engaged and the brake 120e on the propeller drive is disengaged. As such, the electric motor 18 and the combustion engine and turbocharger 12, 14 compound powers to drive the propeller 11, the compressor 16 and the accessories 24 via the gear train of the transmission 120.

As shown in FIG. 4b, in the APU mode, the second clutch 120d is disengaged, thereby disconnecting the propeller 11 from the transmission 120. The first clutch 120c on the combustion engine 12, 14 may be engaged for operation of the compressor 16 with both the combustion engine module 12, 14 and the electric motor 18 or disengaged for operation with the electric motor 18 only. Alternatively, the APU mode may be with the combustion engine module 12, 14 only. This may be achieved by engaging the first clutch 120c and by not energising the electric motor 18. The brake 120e on the propeller drive may be engaged in all APU mode scenarios. The electric motor 18 may be used as a generator in both of the APU and propulsion mode. The generator 18 may therefore be used to recharge batteries of the aircraft equipped with the power plant 100c or for providing electrical power to systems of said aircraft.

For operating the aircraft power plant 10, in an Auxiliary Power Unit (APU) mode, a first rotational input from the electric motor 18 is transmitted to the compressor 16 along a drive path while a second rotational input from the combustion engine 12 is maintained separate from the output shaft 23; and in a propelling mode, the second rotational input is transmitted to the output shaft 23 via the drive path to drive the output shaft 23 with both of the combustion engine 12 and the electric motor 18.

In the embodiment shown, transmitting the second rotational input to the output shaft 23 includes drivingly engaging the combustion engine 12 to the drive path via the clutch.

Parallel Paths

Figure 5A:
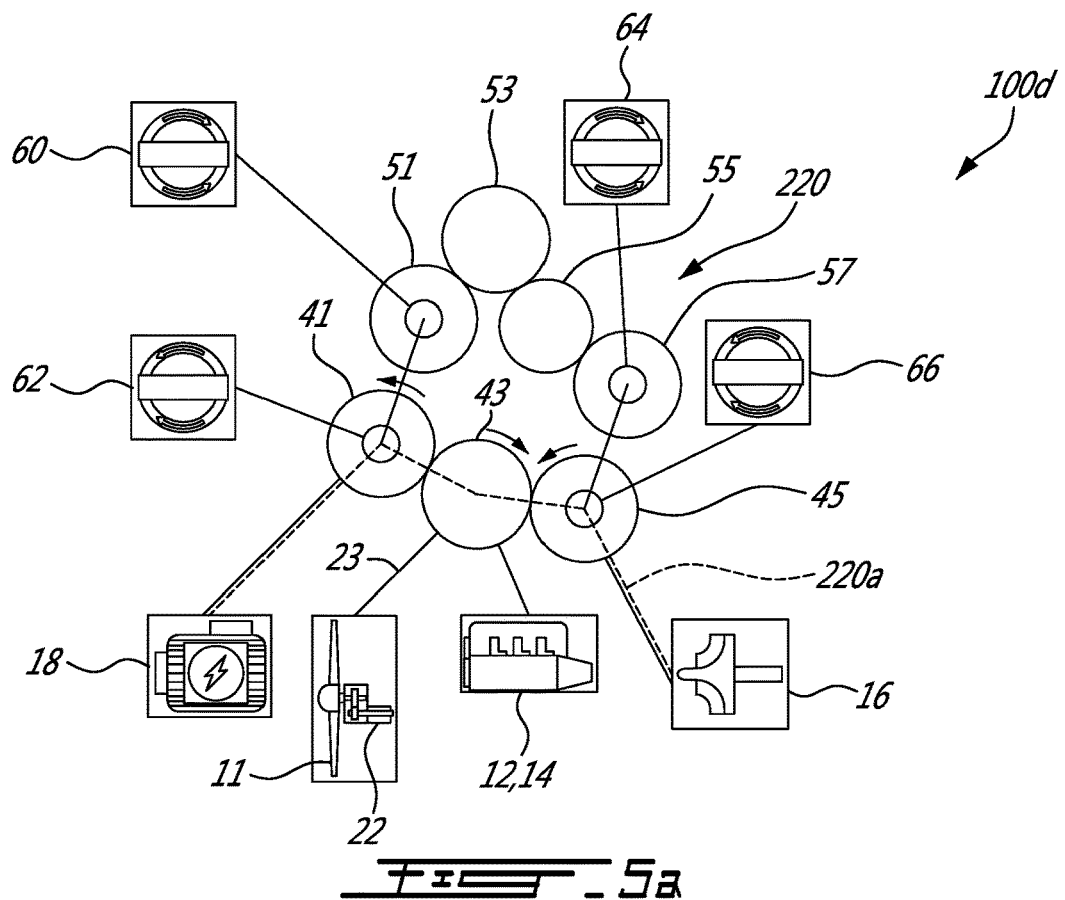
FIGS. 5a and 5b are schematic views of another aircraft power plant operable in a propulsion mode (FIG. 5a) and in an APU mode (FIG. 5b) in accordance with one embodiment.
Figure 5B:
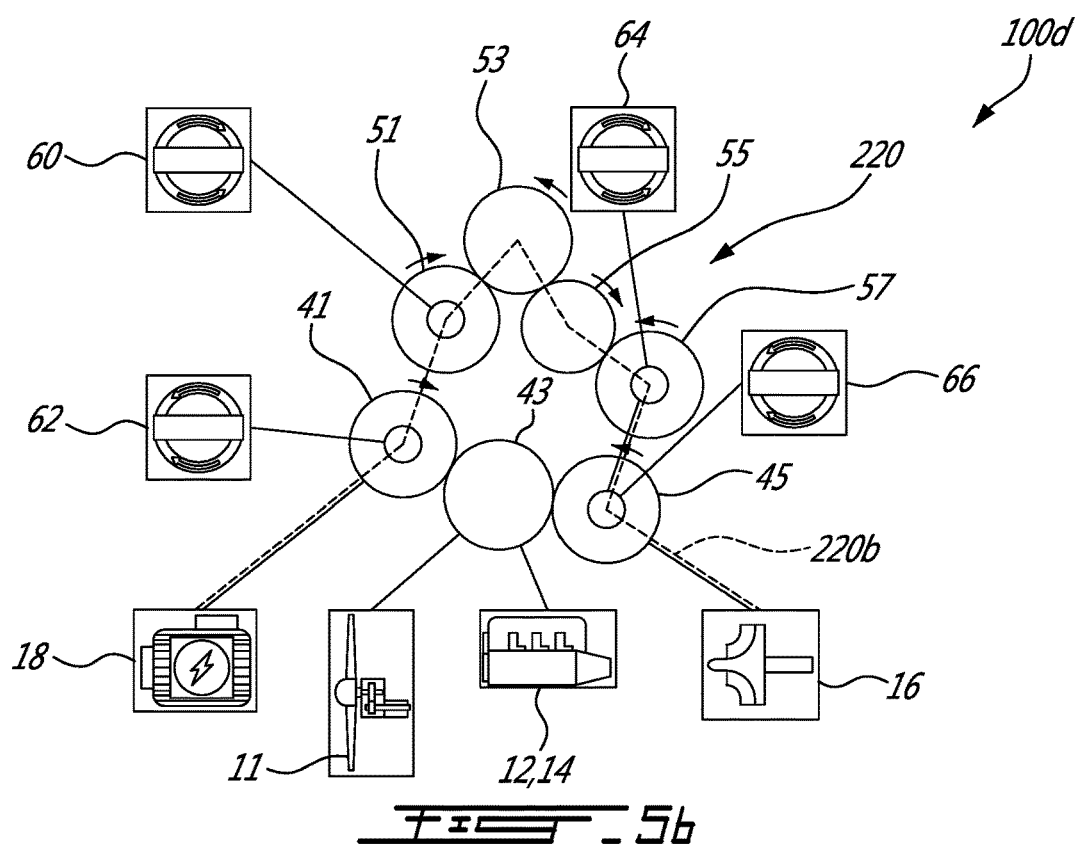

Referring now to FIGS. 5a and 5b, another embodiment of an aircraft power plant is shown generally at 100d. The power plant 100d has a transmission 220 defining first and second drive paths 220a, 220b. The combustion engine 12 and the output shaft 23 are in driving engagement with the first drive path 220a. The electric motor 18 and the compressor 16 drivingly engageable to one another via either one of the first drive path 220a or the second drive path 220b. The selection of which of the first and second drive paths 220a, 220b is used may be function of a direction of rotation of the electric motor 18.

In the embodiment shown, the first drive path 220a comprises an electric motor gear 41, a combustion engine gear 43 and a compressor gear 45. The electric motor 18 and the combustion engine 12 respectively provides first and second drive inputs to the first drive path 220a via their respective gears. The first drive path 220a has a first output drivingly connected to the RGB 22 of the propeller 11 via the combustion engine 12 and output shaft 23 and a second output to the compressor 16 by virtue of the driving engagement between the combustion engine gear 43 and the compressor gear 45.

The second drive path 220b comprises a number of idler gears 51, 53, 55, 57. It is noted that the number of idler gears is selected so that the compressor 16 may be always driven in the same direction of rotation irrespective of whether the power is transferred via the first or via the second drive paths 220a, 220b. The first or input idler gear 51 is connected to the electric motor 18 shaft via a first one-way clutch 60. The first one-way clutch 60 may allow torque to be transferred from the electric motor 18 to the input idler gear 51 of the second drive path 220*b* in one rotation direction only (the clockwise (CW) direction in the illustrated example). However, if the output shaft of the electric motor 18 is driven in a counter clockwise (CCW) direction as shown in FIG. 5*a*, no torque is transferred from the electric motor 18 to the input gear 51 of the second drive path 220*b* and, thus, the second drive path 220*b* is disabled.

A second one way-clutch 62 may be provided on the electric motor shaft to allow torque to be transferred from the electric motor gear 41 to the combustion engine gear 43 in only one rotation direction of the electric motor gear (the CCW direction in the illustrated example).

A third one-way clutch 64 is provided at the output end of the second drive path 220*b* to prevent a torque to be transferred from the compressor shaft to the output idler gear 57 of the second drive path 220*b* when the combustion engine 12 is operated in the propulsion mode.

A fourth one-way clutch 66 is provided between the compressor 16 and the combustion engine 12. The fourth one-way clutch 66 may allow power to be transferred from the combustion engine gear 43 to the compressor gear 45 but may prevent the opposite. That is, when the compressor 16 is driven through the second drive path 220*b*; the torque transferred to the compressor 16 is not transferred to the combustion engine gear 43.

As shown in FIG. 5*a*, in the propulsion mode, the electric motor 18 is driven in the CCW direction. Under such circumstances, no torque is transferred to the second drive path 220*b* due to the presence of the first one-way clutch 60. The second drive path 220*b* is thus disabled. The power is transmitted through the first drive path 220*a* as allowed by the second gear clutch 62 due the rotation direction of the electric motor. The power of the electric motor 18 and the combustion engine 12 may be combined to drive the propeller 11 and the compressor 16 via the first drive path 220*a*. The third one-way clutch 64 prevents torque transfer from the compressor shaft to the last idler gear 57 of the second drive path 220*b*.

As shown in FIG. 5*b*, in the APU mode, the electric motor 18 is driven in a CW direction, thereby disabling the first drive path 220*a* via the second one-way clutch 62. When the electric motor 18 is driven in the CW direction the first one-way clutch 60 allows a torque to be transferred from the electric motor gear 41 to the second drive path 220*b*. Therefore, by rotating the electric motor 18 in the CW direction, the power is transmitted through the second drive path 220*b* rather than the first drive path 220*a*. In this way, the electric motor 18 may be energized to drive the compressor without driving the propeller 11.

Moreover, in the APU mode, the electric motor 18 drives the compressor 16 and bypasses the combustion engine 12. In other words, the combustion engine 12 is excluded from the second drive path 220*b*. This allows the electric driving of the compressor 16 without having to operate the combustion engine 12 (combustion engine may remain shut down) and without having to rotate a shaft of the combustion 12 when said engine is shut down. In other words, the electric motor 18 may not have to overcome a load resulting from the combustion engine 12 being inoperative.

Note that the initial choice of direction of rotation is arbitrary but was given in the example to illustrate the equipment with a unique direction of rotation. Also, it is understood that the combustion engine, turbine, compressor and the pumps are provided with the same rotation direction in both the propulsion mode and the APU mode.

Figure 6A:
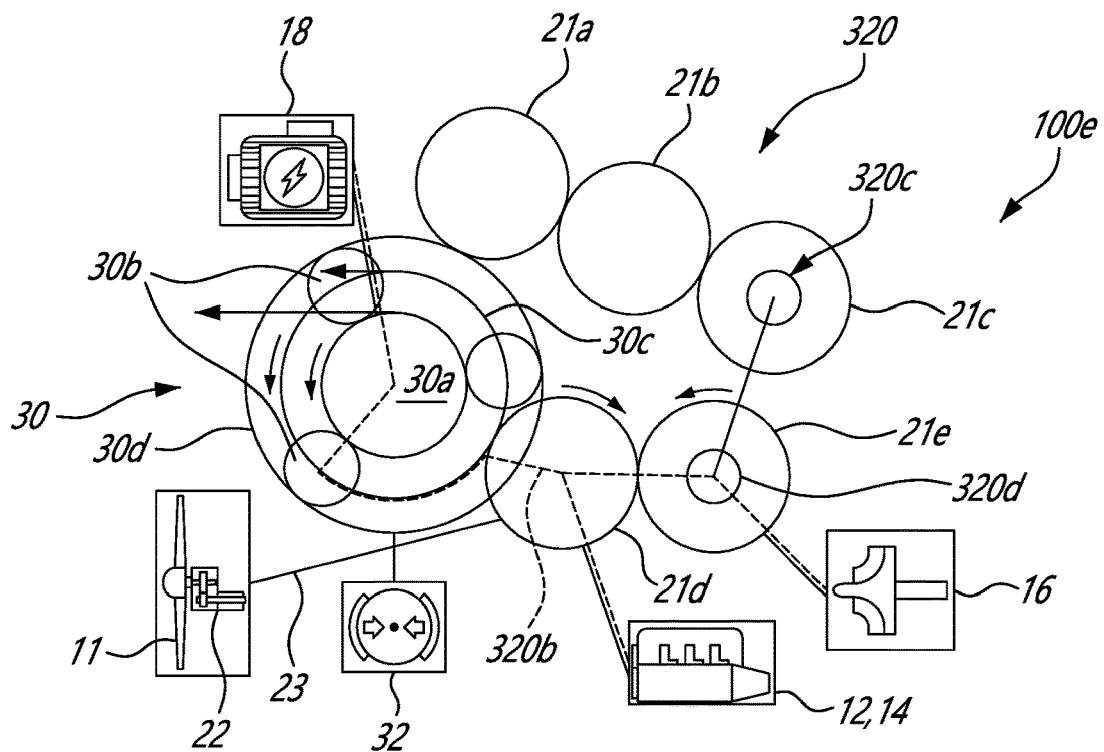
FIGS. 6a and 6b are schematic views of another aircraft power plant operable in a propulsion mode (FIG. 6a) and in an APU mode (FIG. 6b) in accordance with one embodiment.
Figure 6B:
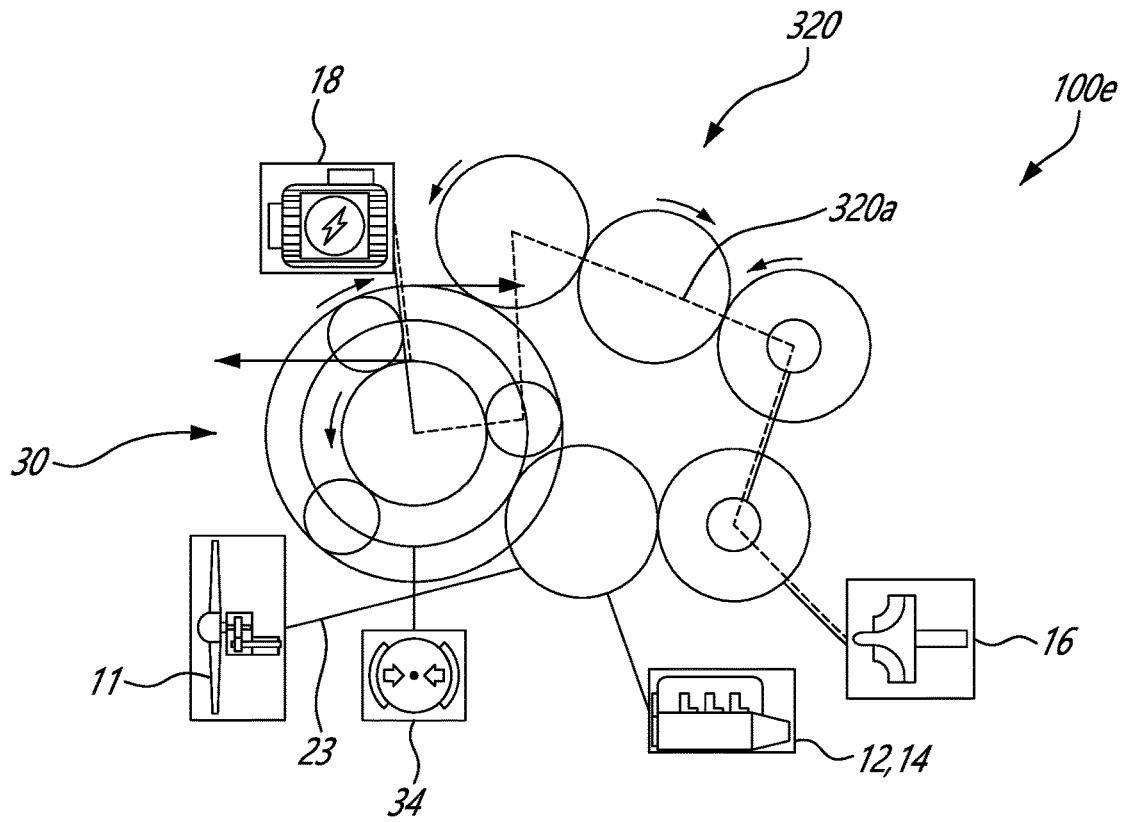

Referring now to FIGS. 6*a* and 6*b*, another embodiment of an aircraft power plant is shown generally at 100*e*. In the embodiment shown, the transmission 320 comprises an epicyclic gear train 30 comprising a sun gear 30*a*, planetary gears 30*b* meshed with the sun gear 30*a* and rotatably mounted on a carrier 30*c* and a ring gear 30*d* meshed with the planet gears 30*b*. In the embodiment shown, a first brake 32 is selectively engageable with the ring gear 30*d* to restrain the ring gear 30 against rotation. A second brake 34 is selectively engageable with the carrier 30*c* to restrain the carrier 30*c* against rotation.

The transmission 320 defines first and second drive paths 320*a*, 320*b* being parallel to one another. As will be seen herein after, the brake positions on the planetary 30 dictates which of the parallel drive paths 320*a*, 320*b* is used.

The first drive path 320*a* is used to transmit rotation of the electric motort 18 to the compressor 16 while bypassing the combustion engine 12 and the output shaft 23 in the APU mode (FIG. 6*b*). The second drive path 320*b* is used to transmit rotation of the electric motor 18 and of the combustion engine 12 to both of the output shaft 23 and to the compressor 16 in the propulsion mode (FIG. 6*a*).

In the embodiment shown, the first drive path 320*a* includes a first gear 21*a* in meshing engagement with the ring gear 30*d*, a second intermediate gear 21*b* and a third gear 21*c* in meshing engagement with the second gear 21*b*. The second drive path 320*b* comprises a combustion engine gear 21*d* on the shaft of the combustion 12, the combustion engine gear 21*d* in meshing engagement with the carrier 30*c* and with a compressor gear 21*e* mounted to the compressor shaft of the compressor 16. A first one-way clutch 320*c* is provided on the compressor shaft between the third gear 21*c* of the first drive path 320*a* and the compressor gear 21*e* of the second drive path 320*b*. A second one-way clutch 320*d* is provided between the combustion engine module gear 21*d* and the compressor gear 21*e*.

In the embodiment shown, the electric motor 18 is in driving engagement with the sun gear 30*a*. As schematically shown in FIG. 6*a*, the combustion engine 12 may be integrated with an internally geared turbocharger 14 as discussed hereinabove.

As shown in FIG. 6*a*, in the propulsion mode, the first brake 32 is engaged with the ring gear 30*d* to lock the same against rotation and the electric motor 18 is energized to drive the sun gear 30*a*, which in turn drives the carrier 30*c* and thus the compressor 16 via the combustion engine gear 21*d* and the compressor gear 21*e* of the second drive path 320*b*. The gears 21*a*, 21*b* and 21*c* of the first drive path 320*a*, which are engaged with the ring gear 30*d*, remain stationary so the torque is only transferred via the second drive path 320*b*. The combustion engine 12 is drivingly engaged to the carrier 30*c* and provides propulsion power to the propeller 11 via the output shaft 23. The electric motor 18 can compound power with the combustion engine 12 to drive the propeller 11. More particularly, the electric motor 18 may be used to start the combustion engine module 12 and to add power during take-off. The second one way clutch 320*d* on the compressor shaft allows power to be transferred from the combustion engine gear 21*d* to the compressor gear 21*e* to drive the compressor 16. The first one way clutch 320*c* however may prevent the compressor gear 21*e* from driving the third idler gear 21*c* of the first drive path 320*a*.

As shown in FIG. 6*b*, in the APU mode, the second brake 34 is engaged to lock the carrier 30*c*. In this way, the second drive path 320*b* is drivingly disconnected from the electric motor 18. The electric motor 18 on the sun gear 30*a* drives the ring gear 30*d*, which in turn drives the gears 21*a*, 21*b* and 21*c* of the first drive path 320*a*. The first one-way clutch 320*c* allows power to be transferred from the third idler gear 21c to the compressor shaft to drive the compressor 16. However, the second one-way clutch 320d may prevent the compressor gear 21e from driving the combustion engine gear 27 21d. The combustion engine gear 21d is engaged with the carrier 30c, which is locked, so its rotational speed may be zero. It is noted that the carrier brake 34 also acts like a propeller brake and could be located anywhere on the mechanical path between the propeller 11 and the carrier 30c (i.e. it does not have to directly engage with the carrier). In view of the foregoing, it may be appreciated that in the APU mode, the electric motor 18 may be energized to drive the compressor 16 while the propeller 11 is disabled.

The transmission 320 allows the use of solely one of the two drive paths 320a, 320b at a time. In the propulsion mode, only the second drive path 320b is used and the first drive path 320a remains at rest. In the APU mode, only the first drive path 320a is used and the second drive path 320b remains at rest. It is understood that any other suitable variations of the transmission 320 are contemplated without departing from the scope of the present disclosure. For instance, the electric motor 18 may be drivingly engaged to the carrier 30c, the first drive path 320a may stem from the sun gear 30a and the second drive path 320b may stem from the ring gear. Any other variations are contemplated. Note that, the combustion engine 12 is excluded from the first drive path 320a.

For operating the aircraft power plant 10, in an Auxiliary Power Unit (APU) mode, a first rotational input is transmitted from the electric motor 18 to the compressor 16 along a first drive path while maintaining a second rotational input from the combustion engine 12 separate from the output shaft 23; and in a propelling mode, the first rotational input and the second rotational input are compounded on a second drive path different than the first drive path to drive the output shaft with both of the combustion engine 12 and the electric motor 18.

In the embodiment shown, transmitting the first rotational input from the electric motor 18 to the compressor 16 includes rotating the electric motor 18 in a first rotation direction and compounding the first rotational input and the second rotational input includes rotating the electric motor 18 in a second rotation direction opposite the first rotation direction.

Differential

Figure 7A:
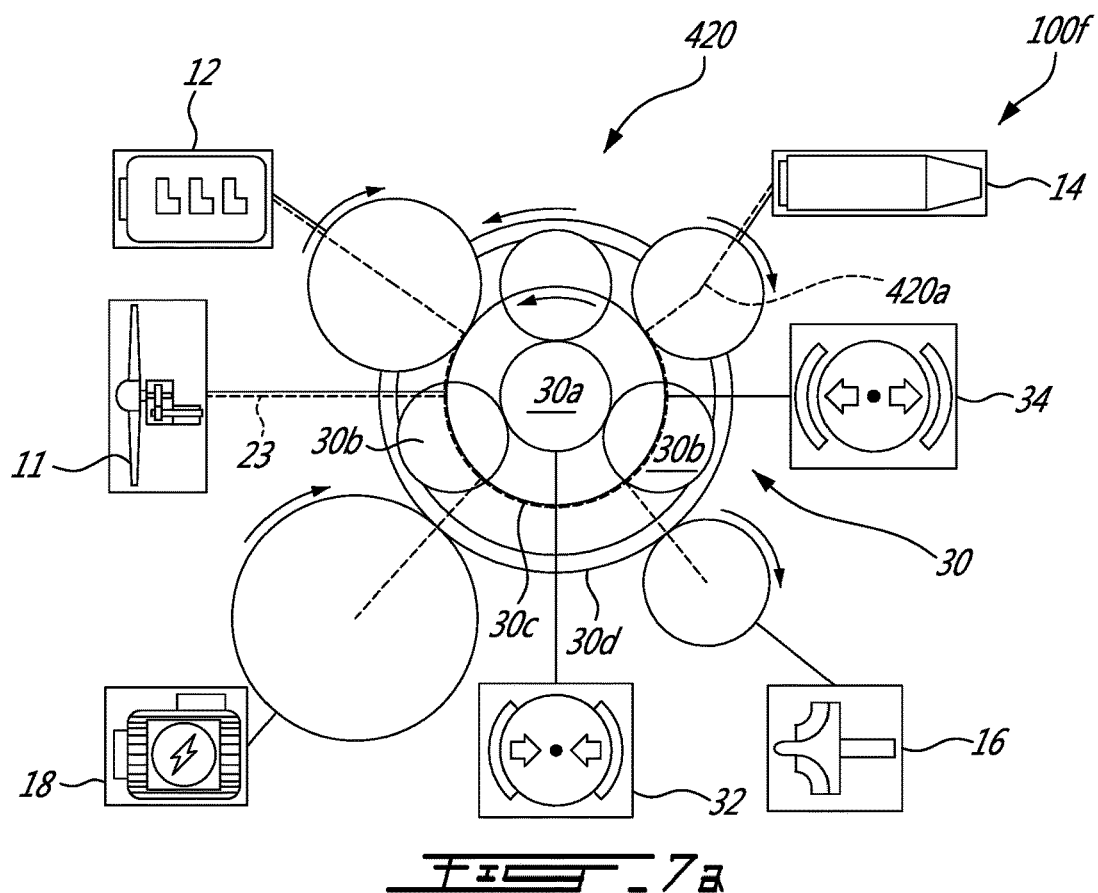
FIGS. 7a and 7b are schematic views of another aircraft power plant operable in a propulsion mode (FIG. 7a) and in an APU mode (FIG. 7b) in accordance with one embodiment.
Figure 7B:
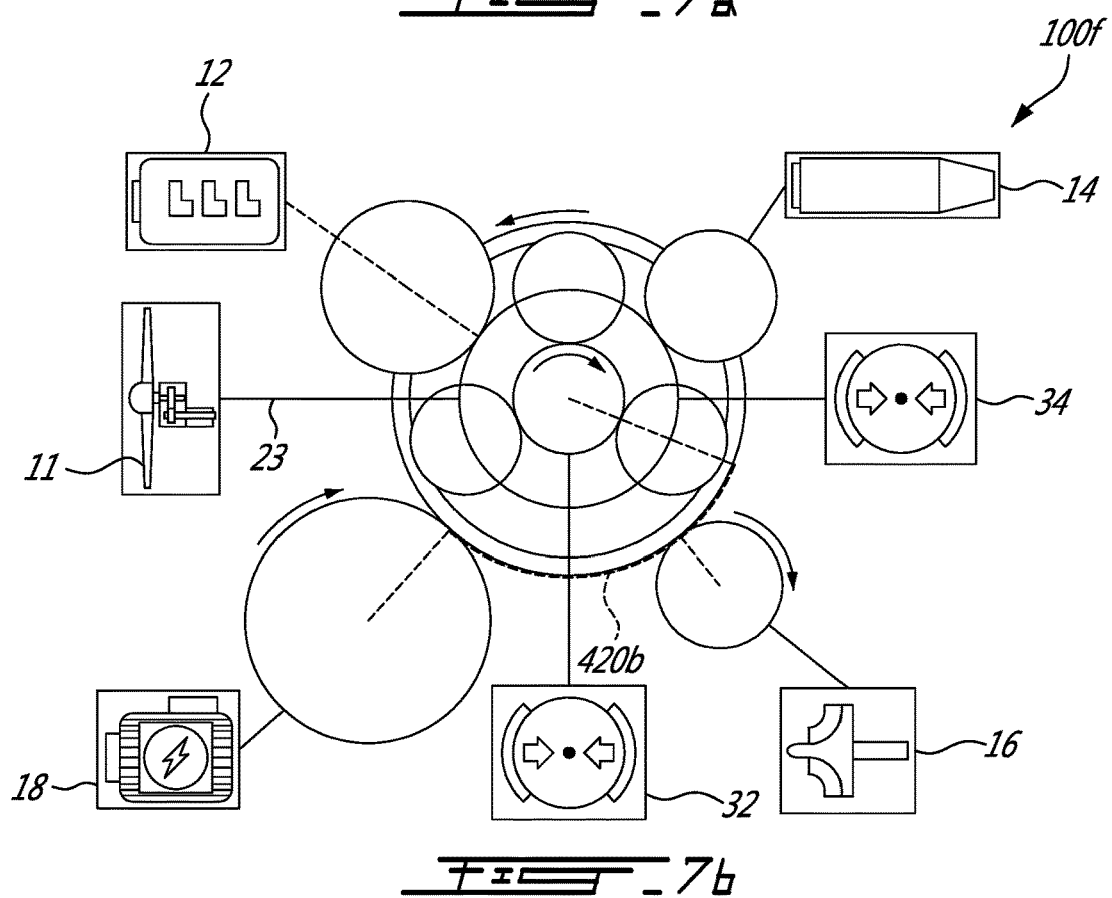

Referring now to FIGS. 7a and 7b, another embodiment of an aircraft power plant is shown generally at 100f. The power plant 100f includes a transmission 420 having an epicyclic gear train 30 comprising a sun gear 30a, planetary gears 30b, a carrier 30c and a ring gear 30d. A first brake 32 and a second brake 34 are provided to dictate what equipment may be driven. The first brake 32 may be engaged to lock the sun gear 30a. The second brake 34 may be engaged to lock the carrier 30c.

The electric motor 18a is drivingly engaged with the ring gear 30d. The ring gear 30d is also drivingly engaged with the compressor 16 via the compressor gear. The turbine 14 and the combustion engine module 12 are drivingly engaged to the carrier 30c. The output shaft 23 is in driving engagement with the carrier 30c.

The transmission 420 is operable in an Auxiliary Power Unit (APU) mode (FIG. 7b) in which the electric motor 18 is in driving engagement with the compressor 16 via the planetary gear train 30 while the combustion engine 12 is disengaged from the output shaft 23, and a propulsion mode (FIG. 7a) in which the combustion engine 12 and the electric motor 18 is in driving engagement with the output shaft 23 via the planetary gear train 30.

The planetary gear train 30 may define a first input, which herein corresponds to the ring gear 30d, a second input, which herein corresponds to the planet carrier 30c, a first output, which herein corresponds to the ring gear 30d, and a second output, which herein corresponds to the carrier 30c. In the embodiment shown, the first input is drivingly engageable with the electric motor 18, the second input is drivingly engageable with the combustion engine 12, the first output is drivingly engageable with the compressor 16, and the second output is drivingly engageable with the output shaft 23. The first input is drivingly engaged to the first output while being disengaged from the second output in the APU mode. The second input is in driving engagement with the second output in the propulsion mode.

As shown in FIG. 7a, in the propulsion mode, the first brake 32 is activated to lock the sun gear 30a. The second brake 34 is disengaged and, thus, the carrier 30c is free to rotate. The combustion engine 12, the turbine 14 and the electric motor 18 may all contribute to power to drive the compressor 16 and the propeller 11. The output shaft of the gearbox 20 may be centered and connected to the carrier 30c to provide a drive input to the RGB 22 driving the propeller 11. The planetary system provides a first stage of speed reduction for the propeller 11. The compressor 16 is driven by the electric motor 18, the combustion engine 12 and the turbine 14 via the ring gear 30d.

In the embodiment shown, and in the propulsion mode, a first drive path 420a is created by the transmission 420 and extends from the combustion engine 12 to the propeller 11 and the compressor 16 via the planet carrier 30c and the ring gear 30d.

As shown in FIG. 7b, in the APU mode, the first brake 32 is disengaged to allow the sun gear 30a to rotate. The second brake 34 is engaged to lock the carrier 30c. The combustion engine 12 and the turbine 14 cannot rotate since they are engaged with the carrier 30c. The electric motor 18 is energized to drive the compressor 16 through the ring gear 30d. The sun gear 30a spins freely in direction opposite to the ring gear 30d. A generator (not shown) could be connected to the sun gear to take advantage of the rotation of the sun gear to recharge battery of the electric motor 18. Alternatively, a dedicated cabin bleed compressor could be connected to the sun gear 30a. Since the gearbox output to the propeller 11 is on the carrier 30c, the second brake 34 may also act as a propeller brake to prevent rotation of the propeller 11 when the engine is used in the APU mode. According to this embodiment, only the electric motor 18 may be used in the APU mode to drive the compressor 16.

In the embodiment shown, and in the APU mode, a second drive path 420b is created by the transmission 420 and extends from the electric motor 18 to the compressor 16 via the ring gear 30d.

In the embodiment shown, the combustion engine 12 is drivingly engageable to the output shaft 23 via the first drive path 420a. The electric motor 18 is drivingly engageable to the compressor 16 via the second drive path 420b. The planetary gear train 30 has an Auxiliary Power Unit (APU) configuration in which the output shaft 23 is disengaged from both of the first and second drive paths 420a, 420b and in which a rotational input of the electric motor 18 is transmitted to the compressor 16 via the second drive path 420b and in a propelling configuration in which the output shaft 23 is drivingly engaged to the combustion engine 12 via the first drive path 420a and in which the first drive path 420a is drivingly engaged to the second drive path 420b.

It is understood that many variations are contemplated. For instance, the combustion engine 12 and the output shaft 23 may be drivingly connected to the sun gear; the electric motor 18 and the compressor 16 may be drivingly connected to the ring gear. Any other variations are contemplated without departing from the scope of the present disclosure. Selection of the most effective combination in any situation may depend on the requirements of the system components in terms of speeds, torques and mechanical packaging to minimize weight and/or volume.

It will be appreciated that the second brake 34 may be omitted if a torque required to induce rotation of the thrust generator is greater than that to induce rotation of the compressor 16. For instance, and referring to FIG. 7b, in the APU mode, the sun gear 30a is free to rotate. Allowing the carrier to rotate, that is by either omitting the second brake 34 or by having the second brake 34 in the disengaged configuration, may allow the electric motor to drive the compressor 16 since the torque may travel along a path of least resistance. In this case, the path of least resistance may extend from the electric motor 18 to the load compressor 16 and may not reach the thrust generator because of relative inertias and internal frictional loads compared to that of the compressor 16. Although many of the power plants described herein may use a plurality of brakes, it will be appreciated that, in some cases as explained above, some of those brakes may be omitted.

Figure 8A:
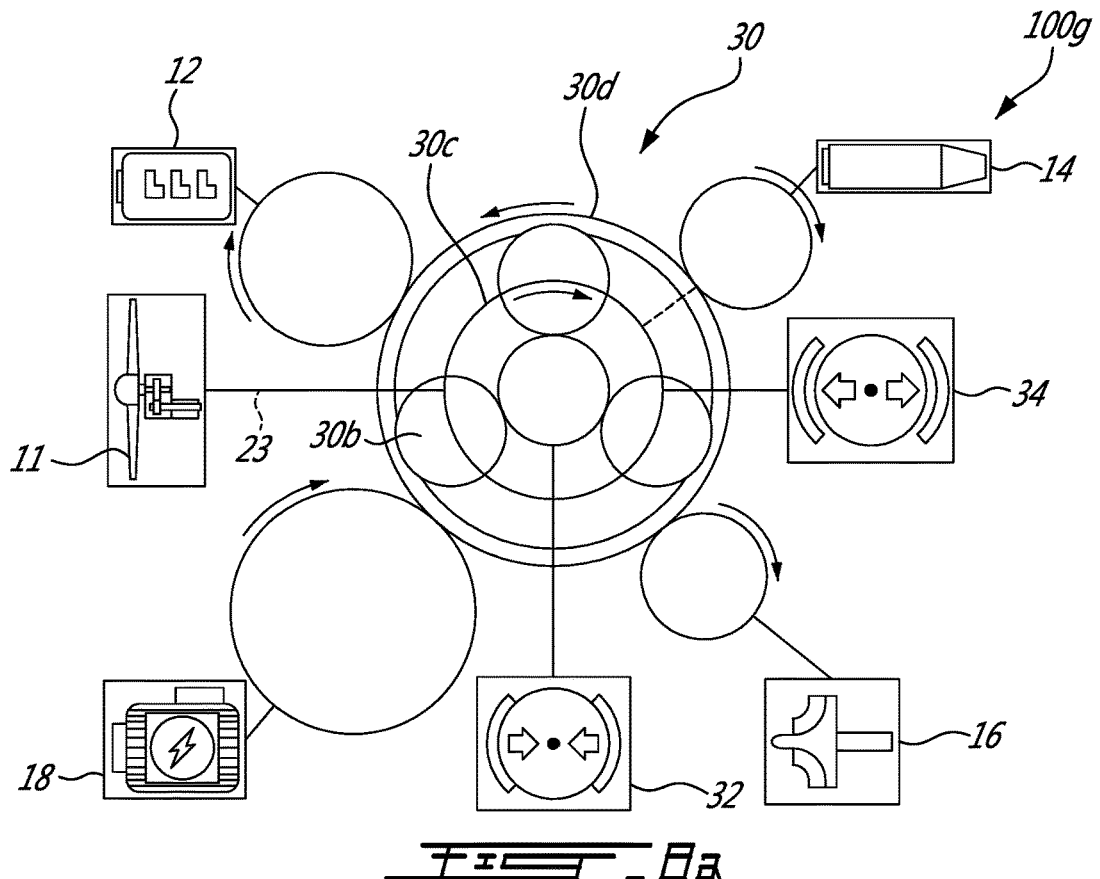
FIGS. 8a and 8b are schematic views of another aircraft power plant operable in a propulsion mode (FIG. 8a) and in an APU mode (FIG. 8b) in accordance with one embodiment.
Figure 8B:
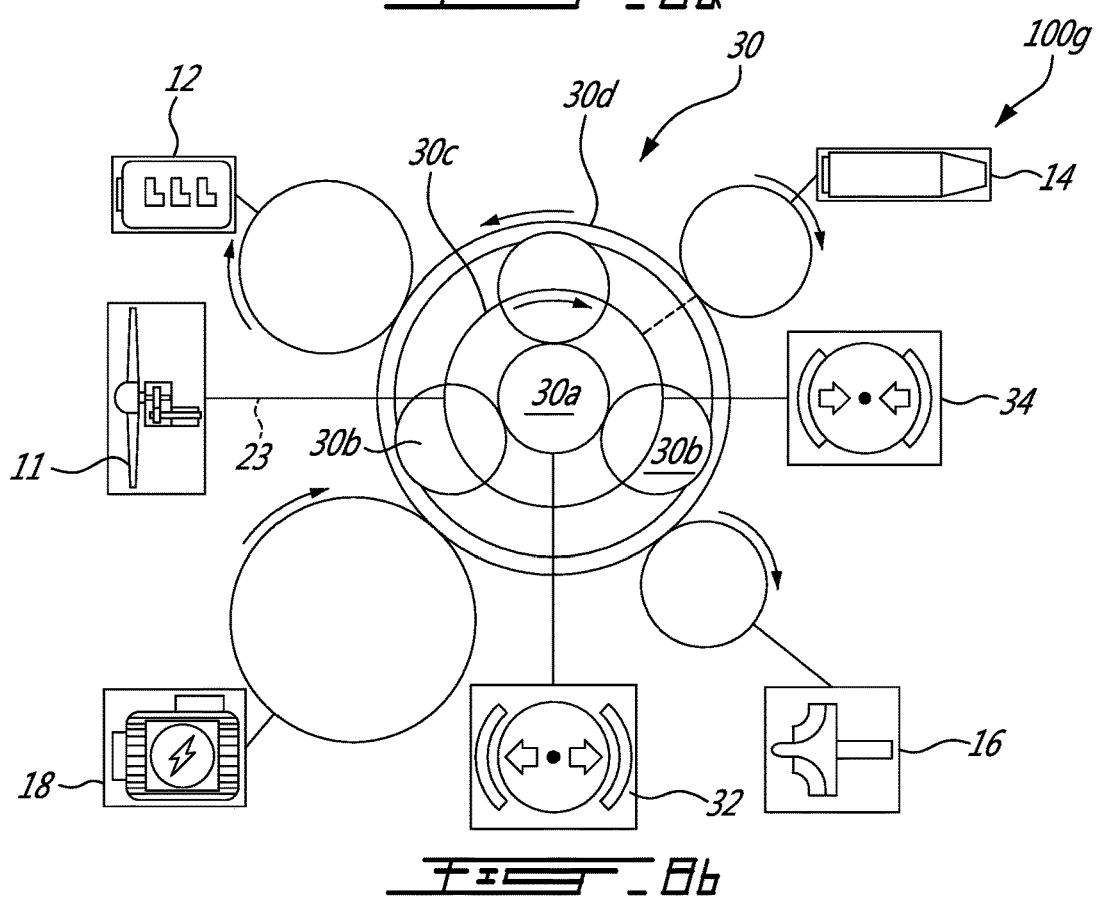

Referring now to FIGS. 8a and 8b, another embodiment of an aircraft power plant is shown generally at 100g. This embodiment is a further variant which essentially differs from the embodiment of FIGS. 7a and 7b, in that the combustion engine 12 and the turbine 14 are drivingly engaged with the ring gear 30d instead of the carrier 30c. According to this variant, the combustion engine 12 and the turbine 14 alone or a combination of the combustion module 12, the turbine 14 and the electric motor 18 may be used in the APU mode to drive the compressor 16. When used alone in the APU mode, the combustion engine 12 may be used to drive the compressor 16 and the electric motor 18 in a generator mode to help recharge the batteries while at the same time providing pressurised air for the cabin. The pressurizing of the air for the cabin and/or the recharging of the batteries may be carried without rotation of the propeller or thrust generator that may hinder freedom of movement around the aircraft during ground servicing.

Figure 9A:
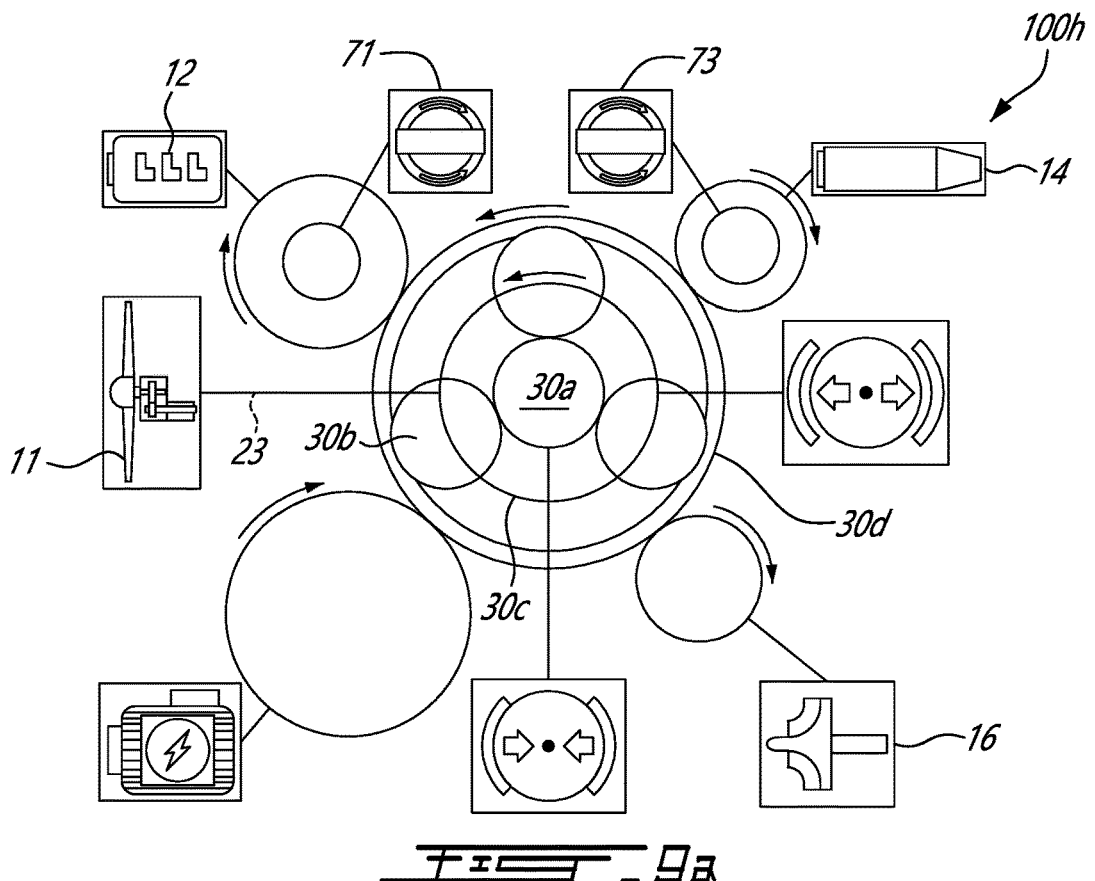
FIGS. 9a and 9b are schematic views of another aircraft power plant operable in a propulsion mode (FIG. 9a) and in an APU mode (FIG. 9b) in accordance with one embodiment.
Figure 9B:
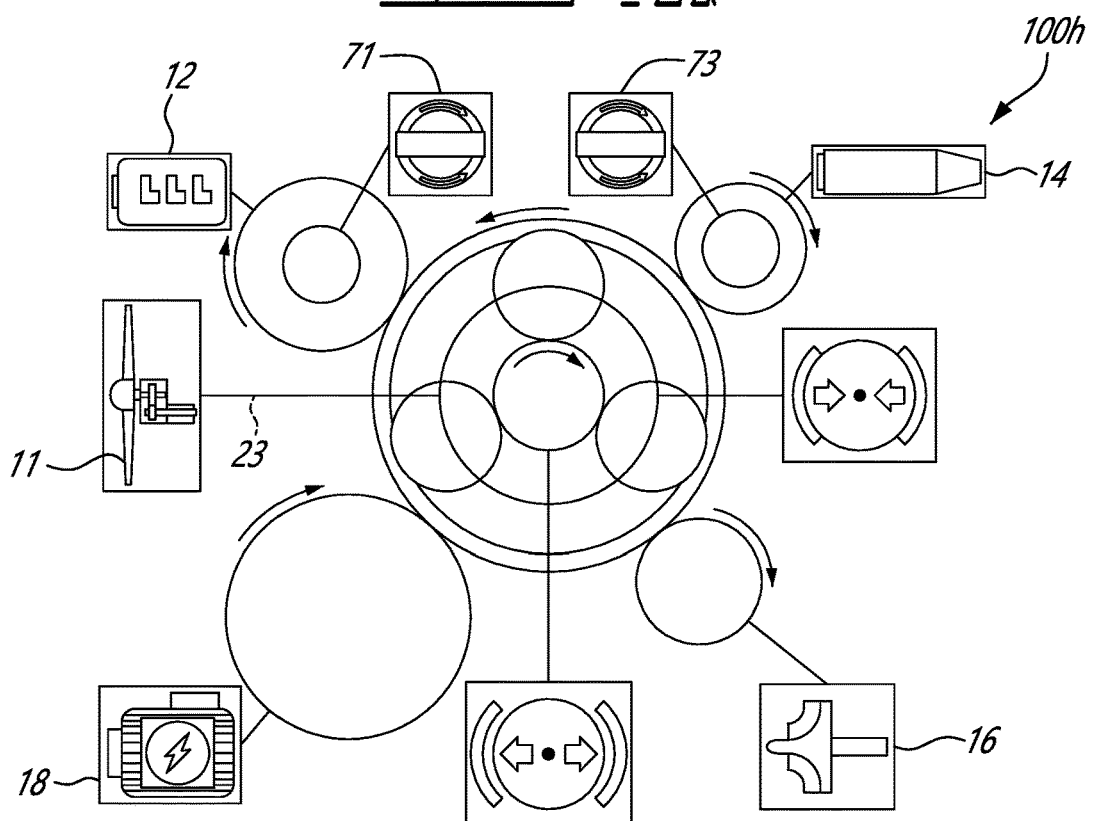

Referring now to FIGS. 9a and 9b, another embodiment of an aircraft power plant is shown generally at 100h. This embodiment is a further variant which essentially differs from the embodiment shown in FIGS. 8a and 8b in that two one-way clutches 71, 73 have been added to allow the electric motor 18 to be used alone in the APU mode to drive the compressor 16. However, a starter (not shown) may be needed to start the combustion engine 12 since the one-way clutches 71, 73 may prevent the electric motor 18 from driving the combustion engine 12 and the turbine 14 via the ring gear 30d.

The first one way clutch 71 is provided on the combustion engine output shaft whereas the second one-way clutch 73 is provided on the turbine 14 output shaft. In the propulsion mode, the first and second one-way clutches 71, 73 allow the combustion engine 12 and the turbine 14 to rotate the ring gear 30d. However, in the APU mode, that is when the carrier 30c is locked, the one-way clutches 71, 73 prevent a torque to be transferred from the ring gear 30d to the combustion engine 12 and the turbine 14. This may allow the electric motor 18 to be used alone to drive the compressor 16. However, if desired, like the previous embodiment, the combustion engine 12, the turbine 14 and the electric motor 18 may be used together to drive the compressor 16 to provide pressurized air to the aircraft cabin. Alternatively, the combustion engine module could be used alone to drive the compressor 16 in the APU mode.

Figure 10A:
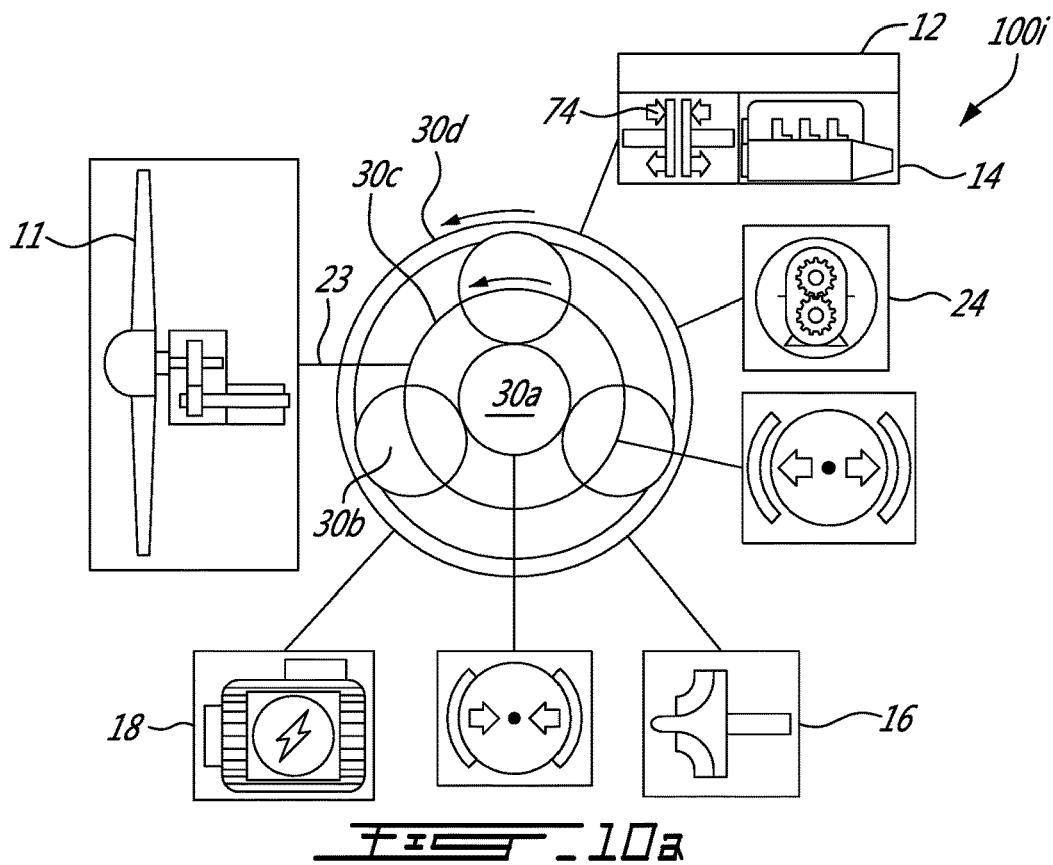
FIGS. 10a and 10b are schematic views of another aircraft power plant operable in a propulsion mode (FIG. 10a) and in an APU mode (FIG. 10b) in accordance with one embodiment.
Figure 10B:
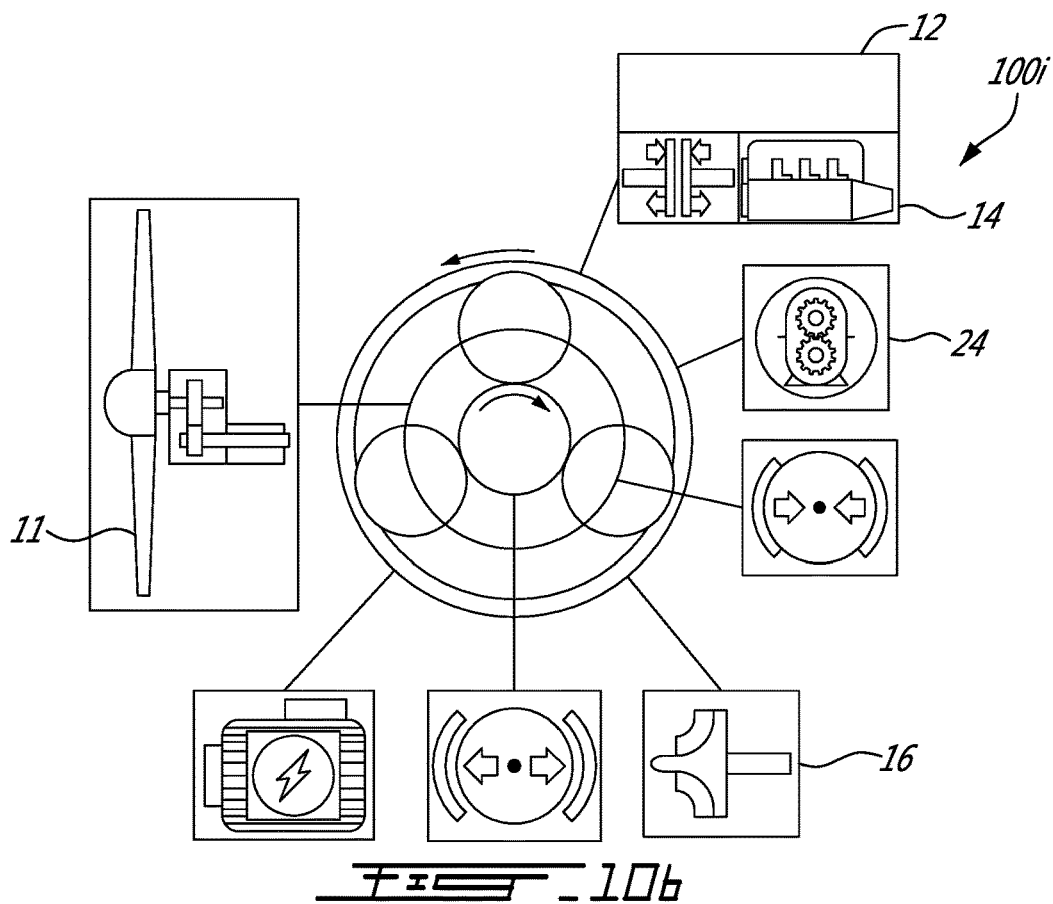

Referring now to FIGS. 10a and 10b, another embodiment of an aircraft power plant is shown generally at 100i. In this case, the combustion engine 12 and the turbine 14 are combined to offer a common input to the planetary gear train 30. An on-off clutch 74 (e.g. electromechanical clutch, hydraulic, or toothed clutch) is provided to selectively connect or disconnect the combined combustion engine and turbine module 12, 14 from the ring gear 30d. The on-off clutch 74 replaces the one-way clutches 71 and 73 in the embodiment of FIGS. 9a and 9b. By replacing the one-way clutches with an on-off clutch, the electric motor 18a can still be used as a starter for the combined combustion engine and turbine module 12, 14.

In the propulsion mode, the clutch 74 is engaged. In this way, the electric motor 18 and the combined combustion engine and turbine 12, 14 may be used to drive the compressor 16 and the accessories 24 via the ring gear 30d. The torque from the ring gear 30d is transmitted to the carrier 30c via the planet gears 30b to drive the propeller 11.

In the APU mode, the clutch 74 may be engaged or disengaged depending if it is desired to use the electric motor 18 alone to drive the compressor 16. By disengaging the clutch 74, the electric motor 18 may be used alone to drive the compressor 16. When the clutch 74 and the brake 34 are engaged, the combined combustion engine and turbine 12, 14 may be used alone or with the electric motor 18 to drive the compressor 16. If the combined combustion engine and turbine module 12, 14 is used alone, the electric motor 18 may be used as a generator to recharge the batteries.

It is understood that combustion engine 12 and the turbo charger turbine 14 do not have to be integrated. They could have separate drive inputs into the planetary gear train 30 as for instance shown in FIGS. 8a and 8b. Separate on-off clutches would then be used on the combustion engine module 12 and on the turbine 14.

Figure 11A:
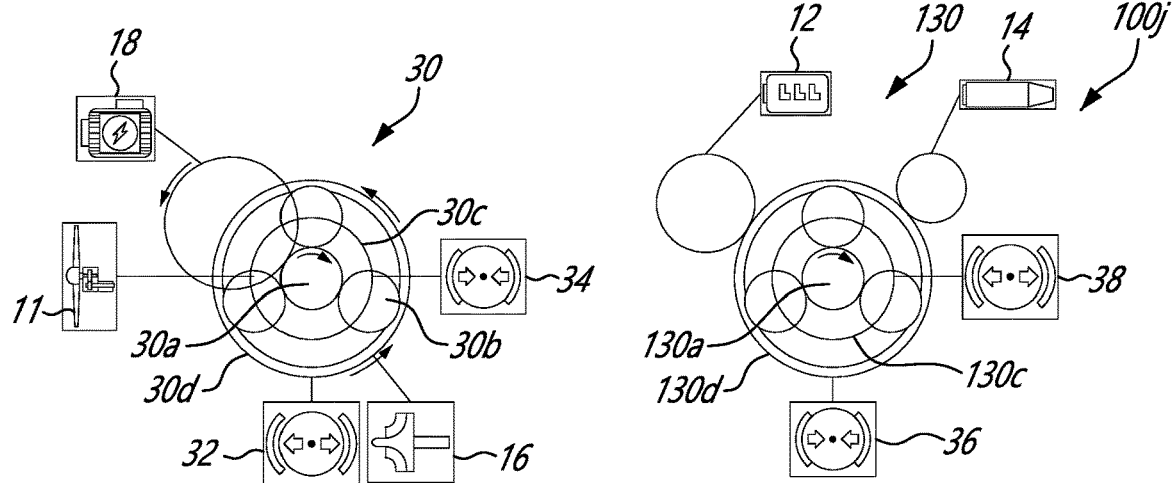
FIGS. 11a to 11c are schematic views of another aircraft power plant operable in a first APU mode (FIG. 11a), in a second APU mode (FIG. 11b), and in a propulsion mode (FIG. 11c) in accordance with one embodiment.
Figure 11B:
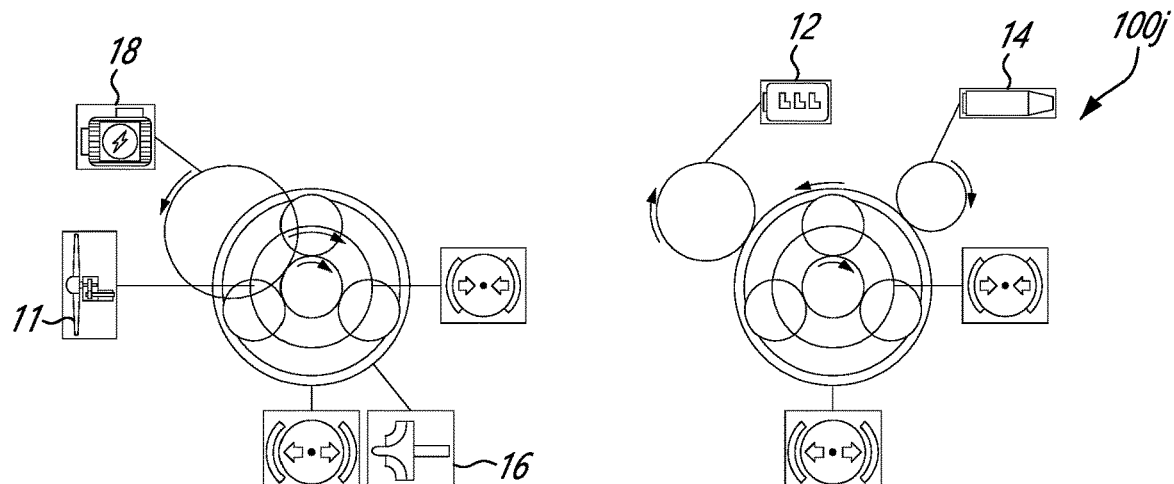
Figure 11C:
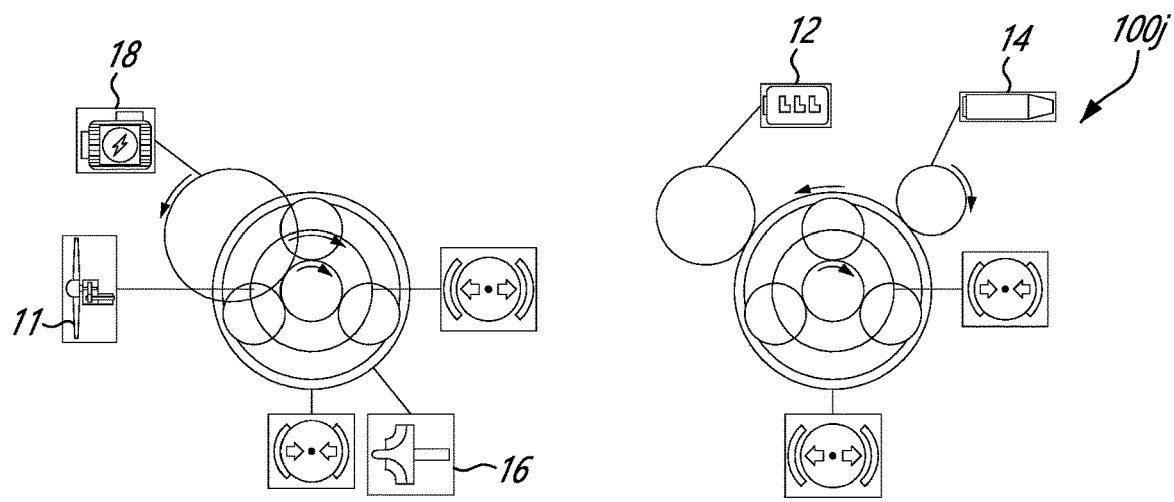

Referring now to FIGS. 11a to 11c, another embodiment of an aircraft power plant is shown generally at 100j. In the embodiment shown, a first planetary gear train 30 and a second planetary gear train 130 are used and connected to one another by respective sun gears 30a, 130a. A shaft may be used to connect the two sun gears 30a, 130a together. The electric motor 18 and the compressor 16 are drivingly connected to the sun gear 30a of the first planetary gear train 30. The combustion engine module 12 and the turbine 14 are drivingly connected to the ring gear 130d of the second planetary gear train 130. The output shaft 23 is drivingly connected to the carrier 30c of the first planetary gear train 30. A first brake 32 is engageable with the ring gear 30d of the first planetary gear train 30. A second brake 34 is engageable with the carrier 30c of the first planetary gear train 30. A third brake 36 is engageable with the ring gear 130d of the second planetary gear train 130. A fourth brake 38 is engageable with the carrier 130c of the second planetary gear train 130. The brake positions dictate what equipment may be driven.

In the APU mode, the second and third brakes 34, 36 are engaged to respectively lock the carrier 30c of the first planetary gear train 30 (and thus the propeller 11) and the ring gear 130d of the second planetary gear train 130. The electric motor 18 is then energized. The electric motor gear drives the sun gear 30a of the first planetary gear train 30, which, in turn, drives the compressor gear and, thus, the compressor 16. The rotation of the sun gear 30a of the first planetary gear train 30 is transmitted to the ring gear 30*d* via the planet gears 30*b*. The ring gear 30*d* of the first planetary 30 rotates freely as it is not linked to any load. The rotation of the sun gear 30*a* of the first planetary 30 is transmitted to the sun gear 130*a* of the second planetary 130 via the shaft connecting the two sun gears 30*a*, 130*a*. The rotation of the sun gear 130*a* of the second planetary 130 is transmitted to the carrier 130*c* via the planet gears 130*b*. Like the ring gear of the first planetary 30, the carrier 130*c* of the second planetary 130 spins freely. The ring gear 130*d* of the second planetary 130 is locked by the third brake 36, thereby preventing rotation of the combustion engine gear and of the turbine gear. Accordingly, the compressor 16 is driven by the electric motor 18 only in the APU mode.

However, as shown in FIG. 11*b*, the combustion engine 12 could be used with the electric motor 18 to drive the compressor 16. This may be done by disengaging the third brake 36 from the ring gear 130*d* of the secondary planetary 130 and by engaging the fourth brake 38 with the carrier 130*c* of the second planetary 130. In such a configuration, the combustion engine module 12 and the turbine 14 can drive the sun gear 130*a* through the ring gear 130*d*. The sun gear 130*a* on the second planetary 130 drives the sun gear 30*a* on the first planetary 30, thereby driving the compressor 16. The combustion engine module 12 can also be used to recharge the batteries in the APU mode by driving the electric motor 18 in a generator mode.

FIG. 11*c* illustrates the propulsion mode. The second brake 34 is disengaged to unlock the carrier 30*c* of the first planetary 30, thereby unlocking the propeller 11. The first brake 32 is engaged to lock the ring gear 30*d* of the first planetary 30. On the second planetary 130, the fourth brake 38 is engaged to lock the carrier 130*c*. The third brake 36 is disengaged to unlock the ring gear 130*d*. The electric motor 18*a* may be energized to crank and start the combustion engine 12. The electric motor 18 drives the sun gear 30*a* of the first planetary 30 and, thus, the sun gear 130*a* of the second planetary 130 via the sun gear interconnecting shaft. The sun gear 130*a* of the second planetary 130 drives the ring gear 130*d* which rotates the combustion engine gear and the turbine gear. Once the starting procedure is completed, the combustion engine module 12 and the turbine 14 can drive the sun gear 130*a* through the ring gear 130*d*. The sun gear 130*a* on the second planetary 130 drives the sun gear 30*a* on the first planetary 30, thereby providing power to the compressor 16. The torque transferred from the combustion engine module 12 and the turbine 14 to the sun gear 30*a* of the first planetary 30 is transferred to the propeller 11 via the carrier 30*c* of the first planetary 30. Accordingly, the combustion engine module 12, the turbine 14 and the electric motor 18*a* may be used all together to drive the propeller 11 and the compressor 16. Alternatively, the combustion engine module 12 could be used without the electric motor 18*a* to drive both the propeller 11 and the compressor 16.

Referring now to FIGS. 12*a* to 12*c*, another embodiment of an aircraft power plant is shown generally at 100 *k*. FIGS. 12*a* to 12*c* show another example of a dual planetary gear train but this time the two planetary gear trains 30, 130 share a "common" ring gear instead of a "common" sun gear. The electric motor 18 and the compressor 16 are connected to the ring gear 30*d* of the first planetary 30. The first brake 32 is engageable with the sun gear 30*a*. The second brake 34 is engageable with the carrier 30*c* on which is connected the propeller 11. The third brake 36 is engageable with the sun gear 130*a* of the second planetary 130. The fourth brake 38 is engageable with the carrier 130*c* of the second planetary 130. The combustion engine module 12 and the turbine 14 are on the carrier 130*c* of the second planetary 130.

FIG. 12*a* illustrates an electric motor only APU mode. In this mode, the second brake 34 is engaged to lock the carrier 30*c* of the first planetary 30 and, thus, the propeller 11. The electric motor 18 can drive the compressor 16 through the ring gear 30*d* using battery or ground electric source. The sun gear 30*a* spins freely in a direction opposite to the ring gear 30*d*. On the second planetary 130, the fourth brake 38 is engaged to lock the carrier 130*c*, thereby preventing torque transmission to the combustion engine gear and the turbine gear. The ring gear 130*d* rotates with the ring gear 30 of the first planetary 30 as the same are connected to rotate in unison. This causes the sun gear 130*a* on the second planetary 130 to spin freely. The electric motor 18 can thus be used alone to drive the compressor 16.

FIG. 12*b* illustrates a combustion engine and electric motor APU mode in which the electric motor 18, the combustion engine 12 and turbine 14 may be jointly used via the interconnected ring gears 30*d*, 130*d* to drive the compressor 16. In this mode, the third brake 36 is engaged to lock the sun gear 130*a* of the second planetary 130 and the fourth brake 38 is disengaged to unlock the carrier 130*c*.

FIG. 12*c* illustrates the propulsion mode. The second brake 34 is disengaged to unlock the carrier 30*c* and, thus, the propeller 11. The first and third brakes 32 and 36 are engaged to lock the sun gears 30*a*, 130*a* of the first and second planetary gear trains 30, 130, respectively. The combustion engine 12 and the turbine 14 may be used to drive the propeller 11 and the compressor 16. Alternatively, the combustion engine 12, the turbine 14 and the electric motor 18 may be used. As may be appreciated from FIG. 12*c*, power from the combustion engine 12 and the turbine 14 may be transferred from the second planetary 130 to the first planetary 30 via the interconnected ring gears 30*d*, 130*d*. The rotation of the ring gear 30*d* on the first planetary 30 is transmitted to the carrier 30*c* via the planet gears 30*b*. The carrier 30*c* in turn drives the propeller 11 through the RGB 22. The electric motor 18 may be energized to compound power with the combustion engine 12 and the turbine 14 via the ring gear 30*d*.

Referring now to FIG. 13, another embodiment of an aircraft power plant is shown generally at 100*l*. FIG. 13 illustrates a further variant of the above double planetary gear train arrangement. According to this embodiment, the first and second planetary gear trains 30, 130 are disposed side-by-side instead of one in front of the other. This arrangement may allow better spacing of driving and driven equipment. According to the illustrated variant, the ring gear 30*d*, 130*d* of the first and second planetary gear trains 30, 130 are synchronised through one or more idler gears (two of which are shown in FIG. 13). Like the previous embodiments, the propeller 11 is on the carrier 30*c* of the first planetary 30 and a brake 34 is provided to selectively lock the carrier 30*c* to allow the hybrid propulsion system to be used in an APU mode. The planetary systems may be placed fore and aft of each other by having the idler wheels replaced by idler lay-shafts that may provide similar torque transmission from first to second planetary stages.

Referring now to FIGS. 14*a* and 14*b*, another embodiment of an aircraft power plant is shown generally at 100 m. In the embodiment shown, a brake 34 may be selectively engaged with the carrier 30*c* to dictate what equipment may be driven. The propeller 11 is once again on the carrier 30*c*. Accordingly, the brake 34 may be engaged to lock the propeller 11 in the APU mode (FIG. 14*b*). According to this variant, the electric motor unit 18 comprises two electric motors 18*a*, 18*b*. The first electric motor 18*a* is drivingly connected to the ring gear 30*d*. The second electric motor 18*b* is drivingly engaged with the sun gear 30*a*. The compressor 16 and the accessories 24 are drivingly connected to the ring gear 30*d* just like in the previous embodiments. The turbocharger turbine 14 is integrated with the combustion engine 12 to provide a common input on the carrier 30*c*.

In the propulsion mode (FIG. 14*a*), the brake 34 is disengaged, thereby allowing the carrier 30*c* and the propeller 11 to be driven in rotation. Both electric motors 18*a*, 18*b* rotate in the same direction and at the same speed as the integrated combustion engine and turbine 12, 14. The electric motor sizing may account for different torque requirements on the ring gear 30*d* and on the sun gear 30*a* depending of which of the ring gear 30*d* or sun gear 30*a* drives the accessories 24 and the compressor 16. In the illustrated embodiment, the first electric motor 18*a* on the ring gear 30*d* is used as a generator such that the carrier 30*c* sees the same resistance torque from the sun gear 30*a* (which drives the compressor 16) as from the ring gear 30*d*. The electric power obtained from the first electric motor 18*a* may be used to recharge batteries or to drive the electric motor 18*b* on the sun gear 30*a*. Both electric motors 18*a*, 18*b* may be used in tandem to vary the compressor speed on demand.

In the APU mode (FIG. 14*b*), both electric motors 18*a*, 18*b* turn in opposite directions. As an alternative, the compressor 16 and accessories 24 could be both driven from the same gear (the sun gear or the ring gear). It is also noted, that this system could work without a brake as the engine control could ensure that the counter rotation of the ring gear 30*d* and sun gear 30*a* results in zero rpm on the carrier 30*c*. With this system, only the electric motors 18*a*, 18*b* may be used in the APU mode.

Referring now to FIG. 15*a*, another embodiment of an aircraft power plant is shown generally at 100*n*. In the embodiment shown, the propeller 11 is drivingly connected to the carrier 30*c*. A first brake 32 may be provided for engagement with the carrier 30*c*. A second brake 34 may be provided for engagement with the ring gear 30*d*. Contrary to the previous differential embodiments, the compressor 16 and the accessories 24 are driven by the sun gear 30*a* (i.e. not the ring gear 30*d*). The carrier 30*c* is driven by a combustion engine 12, a turbine 14, an electrical motor 18 or a combination thereof. The torque on the ring gear 30*d* may be controlled by a generator 18*b*. It is a unit different than the main propulsion electrical motor/generator 18 and may typically be much smaller. When two electric motors 18, 18*b* are used, one may be used for propulsion while the other is used for driving the compressor 16 and the accessories 24 in the APU mode, the electric motor 18 drivingly connected to the carrier 30*c* being the one used for propulsion. The second electric motor 18*b* is drivingly connected to the ring gear 30*d* to drive the compressor 16 on the sun gear 30*a* when the carrier 30*c* is locked by the carrier brake 34 (APU mode). Additional gears may be required between the power sources and the ring gear 30*d* to drive the high speed equipment as the ring gear 30*d* and the carrier 30*c* may be limited in speed. It is noted that the brakes or locking devices on the carrier 30*c* and ring gear 30*d* are optional but may be of interest as may be appreciated from the speed distribution diagrams shown in FIGS. 15*b* to 15*g*. The accessories 24, including the oil pumps, may be on the same drive as the compressor 16 to ensure proper lubrication in APU mode. In the APU mode, only one electric motor 18*b* may be used to drive the compressor 16 and the accessories 24.

FIGS. 15*b* to 15*g* respectively illustrate the operation of the embodiment shown in FIG. 15*a* in the propulsion and the APU mode. The different directions of rotation are depicted with arrows. At engine start (FIG. 15*b*), if there is no load on the generator 18*b*, the movement will go where there is no resistance. In this case, the movement will go to the ring gear and there will be almost no rotation of the sun gear 30*a*. If some load is applied to the generator 18*b* (FIG. 15*c*), the movements will balance as a function of the respective torques at the ring gear generator 18*b* and at the sun gear compressor 16. Adding generator torque load at the ring gear 30*d* may reduce the ring gear speed and will increase the compressor speed. As further generator load is applied (FIG. 15*d*), the sun gear compressor speed is further increased. The generator 18*b* may be able to generate enough torque to compensate the compressor drive torque. The power produced by the generator 18*b* may not be lost as it may be used to recharge batteries. However, there may be a 20% loss in the generator power (10% when producing it and send it to the batteries and another 10% when using it back from the batteries to the electric motor 18. As an optional feature to avoid long periods of energized generator and reduce the losses, it may be possible to have a brake or solenoid actuated locking pin to maintain the ring gear fixed (FIG. 15*e*) at a pre-defined compressor speed. The system may be limited to the functions defined above but it could also be defined for the generator to also have a motor mode (FIG. 15*f*). Passed the point of 0 RPM on the ring gear, the electrical motor/generator 18*b* may rotate the ring gear 30*d* in the direction opposite the sun gear 30*a* which may add more speed to the sun gear compressor 16. The generator 18*b* may be used as an electric motor when the combustion engine 12 is shut down (FIG. 15*g*) and rotate the compressor in an APU mode to ventilate an aircraft cabin when the aircraft is on ground electrical power to charge the batteries. For this APU mode, a brake or lock pin could ensure that the carrier drive remains at rest. Alternatively, a counter acting torque applied at the main motor 18 could be used to maintain the carrier at rest.

General Notes about the Proposed Concepts

Number of gears and direction of rotations may be variable and may depend on the exact size and speed of driving and driven equipment. For instance, in a given design, idler gears may have to be added to obtain a specific distance between shafts or to respect the rotational direction of an existing item.

In some of the presented concepts, specific directions of rotation have been shown. This was only to demonstrate that the concepts in question maintain the desired rotational directions when the system is switched from Propulsion Mode to APU Mode (or vice versa)

When running the power plants in APU mode, lubrication and cooling functions are maintained on the portions of the power plant that remain active. Some of the concepts show where the accessory drive could be located but for diagram simplicity, it was not shown on all concepts. Where not shown, it may be assumed that the accessory drive will be on the same section of the gear train as the electric motor or Compressor as these items are always active in APU mode.

To provide air services to the aircraft, the boost compressor 16 would need to be sized to support cabin bleed in addition to engine air flow and the air delivery line would need to have a bleed valve sized and controlled accordingly. The bleed valve and bleed controls are not discussed.

In some of the concepts with a planetary gear train, the planetary system can also constitute a 1st stage of speed reduction, therefore reducing the last ratio required on the RGB.

Embodiments showing two interconnected planetary systems do not show all the possible interconnection combinations (i.e. sun-sun, sun-carrier or sun to ring and vice versa). However all possibilities are contemplated as the selection of a specific interconnection would be dependent upon specific equipment speeds and packaging conditions.

All embodiments using brake or clutch engagements are based on engagement or disengagement when all power sources are turned off except for the electric motor which may be rotated at very slow speed to ensure the brake or clutch engagement are not falling on a metal to metal contact point and therefore may be engaged at all times. The presence of the electric motor may eliminate the concerns relative to the ability to engage the brakes or clutches from any rest position.

Proper and complete engagement of brakes and clutches may be confirmed by proximity probes or limit switches. For sake of simplification, the use and positioning of such sensors are not shown in the concept diagrams.

In some cases, it may be possible to replace two brakes with a single brake that would have two positions, locking one shaft or another shaft depending on its selected position. As such a brake would have to be designed for each specific application; all the concepts are shown with individual brakes for each location where a braking action would be required.

Because brakes and clutches are only engaged or disengaged at very low speed (could be less than 30 RPM as an indicative value) the brakes and clutches may be of positive engagement types rather than friction types, ensuring a more reliable brake action.

Brakes and clutches may be actuated by hydraulic forces or electromagnetic forces or any other suitable actuation means.

As mentioned herein before, the compressor may be a dedicated cabin bleed compressor (i.e. not necessarily the boost compressor feeding pressurized air to the internal combustion inlet). This alternative is not specifically shown in all the drawings but it may be imagined easily simply by replacing the engine boost compressor in any of the diagrams by a dedicated cabin air compressor and moving the boost compressor to a gear driven by the combustion engine module 12.

Another alternative applicable to some of the embodiments would be to add a dedicated cabin air compressor or an additional generator to the branch of a planetary system that is left to spin freely when the system is operated in APU mode. This would be applicable to the embodiments of FIGS. 7 to 15 where either a sun gear, a carrier or a ring gear spins freely when the system is in APU mode. However, this dedicated cabin compressor or generator would be operable in APU Mode only and would not be available in Propulsion mode.

Most of the embodiments with one electric motor can also accommodate more than one electric motor if required for redundancy or to address a problem of limited space that would prevent the installation of one larger electric motor at the required location in the gear train.

In two electric motor arrangements, typically, one of the electric motor could be sized to drive the cabin air compressor only in APU mode and the sum of power of the two electric motors is the same as the electric power in the schemes with only one electric motor. Both electric motors assist the ICE/Turbine Modules during Take-off.

The power plants described herein above may allow driving the compressor 16 electrically while the combustion engine 12 and other components may remain at stop. The disclosed power plants are hybrid in that they use both of an electric motor and a combustion engine whose rotational inputs may be compounded to drive a thrust generator, such as the propeller 11. The power plants may be used in propulsion modes and in APU mode. They may allow the aircraft to avoid using a dedicated APU since the power plants are able to cater to the function of the APU.

It will be further appreciated that, for any of the embodiments disclosed herein, a clutch may be provided between the propeller 11 and the transmissions to selectively disengage the propeller 11 from the transmission. This may allow driving the compressor with the electric motor alone, with the combustion engine alone, or with a combination of the electric motor and the combustion engine. In other words, in the APU modes, one or both of the electric motor and the combustion engine may be used. The output shaft may be considered as the shaft being in driving engagement with the RGB. Such a clutch may be located between the RGB and the transmission to selectively disconnect the output shaft from the transmission.

All the concepts showing a planetary gear train where all the elements (sun gear, ring gear and carrier) can be in rotational movement depending of applied torques or applied brakes may be considered concepts using the differential characteristics of the planetary system. There are other types of differential gear trains that may be used without departing from the scope of the present disclosure.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft power plant comprising:
   an electric motor;
   a compressor;
   a combustion engine;
   an output shaft drivingly engageable to a thrust generator for propelling an aircraft equipped with the aircraft power plant; and
   a transmission including a gearbox having a first input drivingly engaged by the electric motor, a first output drivingly engaging the compressor, a second input drivingly engageable by the combustion engine, and a second output drivingly engageable to the output shaft,
   wherein the transmission has:
      a propulsion configuration in which the output shaft and the compressor are drivingly engaged to the electric motor and to the combustion engine via the gearbox, and
      an auxiliary power unit configuration in which the combustion engine and the output shaft are at rest while the electric motor drivingly engages the compressor.

2. The aircraft power plant of claim 1, wherein the gearbox is a planetary gear train having a sun gear, planet gears meshed with the sun gear and rollingly supported by a planet carrier, and a ring gear meshed with the planet gears.

3. The aircraft power plant of claim 2, wherein the first input is engaged to one of the sun gear, the planet carrier, and the ring gear, the first output engaged to the one of the sun gear, the planet carrier, and the ring gear, the second input engaged to another one of the sun gear, the planet carrier, and the ring gear, and the second output engaged to the other one of the sun gear, the planet carrier, and the ring gear.

4. The aircraft power plant of claim 3, wherein the first input is engaged to the ring gear, the first output engaged to the ring gear, the second input engaged to the planet carrier, and the second output engaged to the planet carrier.

5. The aircraft power plant of claim 3, comprising a brake engaged to a remaining one of the sun gear, the planet carrier, and the ring gear, the brake having an engaged configuration in which rotation of the remaining one of the sun gear, the planet carrier, and the ring gear is blocked and a disengaged configuration in which rotation of the remaining one of the sun gear, the planet carrier, and the ring gear is permitted, the brake being in the engaged configuration in the propulsion configuration and in the disengaged configuration in the auxiliary power unit configuration.

6. The aircraft power plant of claim 2, wherein the first input is engaged to one of the sun gear, the planet carrier, and the ring gear, the first output engaged to the one of the sun gear, the planet carrier, and the ring gear, the second input engaged to the one of the sun gear, the planet carrier, and the ring gear, and the second output engaged to another one of the sun gear, the planet carrier, and the ring gear.

7. The aircraft power plant of claim 6, wherein the first input is engaged to the ring gear, the first output engaged to the ring gear, the second input engaged to the ring gear via a clutch, and the second output engaged to the planet carrier.

8. The aircraft power plant of claim 6, comprising a brake engaged to a remaining one of the sun gear, the planet carrier, and the ring gear, the brake having an engaged configuration in which rotation of the remaining one of the sun gear, the planet carrier, and the ring gear is blocked and a disengaged configuration in which rotation of the remaining one of the sun gear, the planet carrier, and the ring gear is permitted, the brake being in the engaged configuration in the propulsion configuration and in the disengaged configuration in the auxiliary power unit configuration.

9. The aircraft power plant of claim 2, wherein the first input is engaged to one of the sun gear, the planet carrier, and the ring gear, the first output engaged to another one of the sun gear, the planet carrier, and the ring gear, the second input engaged to the one of the sun gear, the planet carrier, and the ring gear, and the second output engaged to the one of the sun gear, the planet carrier, and the ring gear, and a second electric motor engaged to a remaining one of the sun gear, the planet carrier, and the ring gear.

10. The aircraft power plant of claim 9, wherein the first input is engaged to the planet carrier, the first output engaged to the sun gear, the second input engaged to the planet carrier, the second output engaged to the planet carrier, the second electric motor engaged to the ring gear.

11. The aircraft power plant of claim 10, wherein the second electric motor is operable to drive the compressor while rotation of the planet carrier is blocked by a brake engageable to the planet carrier.

12. The aircraft power plant of claim 1, comprising a turbine having a turbine inlet fluidly connected to an exhaust of the combustion engine, the turbine drivingly engaged to the combustion engine to compound power with the combustion engine.

13. An aircraft power plant comprising:
an electric motor;
a compressor;
a combustion engine;
an output shaft drivingly engageable to a thrust generator for propelling an aircraft equipped with the aircraft power plant; and
a planetary gear train having a sun gear, planet gears meshed with the sun gear and rollingly supported by a planet carrier, and a ring gear meshed with the planet gears, the electric motor engaged to one of the sun gear, the planet carrier, and the ring gear, the compressor engaged to the one of the sun gear, the planet carrier, and the ring gear, the output shaft engaged to another one of the sun gear, the planet carrier, and the ring gear, the combustion engine engaged to the other one of the sun gear, the planet carrier, and the ring gear; and
a brake having operatively connected to a remaining one of the sun gear, the planet carrier, and the ring gear, the brake having:
a first configuration in which the output shaft and the compressor are drivingly engaged to the electric motor and to the combustion engine via the planetary gear train, and
a second configuration in which the combustion engine and the output shaft are at rest while the electric motor drivingly engages the compressor.

14. The aircraft power plant of claim 13, wherein the electric motor and the compressor are engaged to the ring gear, the combustion engine and the output shaft engaged to the planet carrier, the brake operatively connected to the sun gear.

15. The aircraft power plant of claim 13, comprising a turbine having a turbine inlet fluidly connected to an exhaust of the combustion engine, the turbine drivingly engaged to the other one of the sun gear, the planet carrier, and the ring gear to compound power with the combustion engine in driving the output shaft.

16. The aircraft power plant of claim 13, wherein the electric motor and the compressor are engaged to the ring gear, the output shaft engaged to the planet carrier, the combustion engage selectively drivingly engaged to the ring gear via a clutch, the brake engaged to the sun gear.

17. An aircraft power plant comprising:
an electric motor;
a compressor;
a combustion engine;
an output shaft drivingly engageable to a thrust generator for propelling an aircraft equipped with the aircraft power plant; and
a gearbox having a plurality of gears meshed with one another, the gearbox having a first input drivingly engaged by the electric motor, a first output drivingly engaging the compressor and in driving engagement with the first input, a second input drivingly engageable by the combustion engine, and a second output drivingly engageable to output shaft and drivingly engaged to the second input and to the first input;
a first clutch between the combustion engine and the second input, the first clutch having a first engaged configuration in which the combustion engine is drivingly engaged to the second input and a first disengaged configuration in which the combustion engine is disengaged from the second input; and
a second clutch between the output shaft and the second output, the second clutch having a second engaged configuration in which the output shaft is drivingly engaged to the second output and a second disengaged configuration in which the output shaft is disengaged from the second output.

18. The aircraft power plant of claim 17, wherein the electric motor is engaged to the compressor via a first set of gears of the plurality of gears, the second input drivingly engaged to the second output via at least one gear of the first set of gears of the plurality of gears.

19. The aircraft power plant of claim 17, wherein the plurality of gears have different diameters to provide speed ratios.

20. The aircraft power plant of claim 17, wherein the first clutch is in the first engaged configuration while the second clutch is in the second engaged configuration, the first clutch being in the first disengaged configuration while the second clutch is in the second disengaged configuration.

* * * * *